United States Patent
Zhang et al.

(10) Patent No.: US 11,736,173 B2
(45) Date of Patent: Aug. 22, 2023

(54) METHODS AND SYSTEMS FOR RECEIVE AND TRANSMIT BEAM PAIRING IN FULL DUPLEX SYSTEMS

(71) Applicants: Xi Zhang, Kanata (CA); Jianglei Ma, Ottawa (CA)

(72) Inventors: Xi Zhang, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 17/011,645

(22) Filed: Sep. 3, 2020

(65) Prior Publication Data

US 2022/0069884 A1 Mar. 3, 2022

(51) Int. Cl.
| | |
|---|---|
| *H04B 7/06* | (2006.01) |
| *H04B 7/0408* | (2017.01) |
| *H04L 25/02* | (2006.01) |
| *H04L 5/00* | (2006.01) |
| *H04W 76/11* | (2018.01) |
| *H04L 5/14* | (2006.01) |
| *H04B 17/336* | (2015.01) |
| *H04B 17/318* | (2015.01) |

(52) U.S. Cl.
CPC ......... *H04B 7/0695* (2013.01); *H04B 7/0408* (2013.01); *H04B 17/318* (2015.01); *H04B 17/336* (2015.01); *H04L 5/0051* (2013.01); *H04L 5/14* (2013.01); *H04L 25/0226* (2013.01); *H04W 76/11* (2018.02)

(58) Field of Classification Search
CPC .. H04B 7/0695; H04B 7/0408; H04B 17/318; H04B 17/336; H04L 5/0051; H04L 5/14; H04L 25/0226
See application file for complete search history.

(56) References Cited

U.S. PATENT DOCUMENTS

| | | | |
|---|---|---|---|
| 2019/0058561 A1* | 2/2019 | Ho | ............ H04B 7/088 |
| 2019/0182852 A1 | 6/2019 | Zhu et al. | |
| 2020/0037254 A1 | 1/2020 | Comsa et al. | |
| 2021/0351838 A1* | 11/2021 | Zhang | ............ H04B 7/0888 |
| 2021/0367651 A1* | 11/2021 | Zhang | ............ H04B 7/0628 |

(Continued)

FOREIGN PATENT DOCUMENTS

CN 110999142 A 4/2020

OTHER PUBLICATIONS

Huawei, HiSilicon, "Overview of Rel-17 work areas for NR and LTE", 3GPP TSG RAN Meeting #84, RP-191486, Newport Beach, USA, Jun. 3-6, 2019, 22 pages.

(Continued)

*Primary Examiner* — Derrick V Rose

(57) ABSTRACT

Aspects of the present disclosure provide a manner of avoiding excessive latency and resource consumption due to exhaustive beam searching and pairing for finding an appropriate bi-directional beam pair combination with manageable mutual interference to enable point-to-point FD transmission. Aspects of the present disclosure also provide a solution for enabling multi-user transmission where one or all UEs are with FD capability and the cross-UE interference raised from FD transmission are measured and taken into account during multi-user pairing.

20 Claims, 17 Drawing Sheets

(56) References Cited

U.S. PATENT DOCUMENTS

2021/0373118 A1* 12/2021 Bao .................... H04L 5/0058
2022/0069889 A1* 3/2022 Zhang .................. H04B 7/088

OTHER PUBLICATIONS

"3rd Generation Partnership Project; Technical Specification Group Radio Access Network; NR; Physical layer procedures for data" (Release 16), Technical Specification, 3GPP TS 38.214 V16.1.0, Mar. 2020, 151 pages.

Gazestani, Amirhosein Hajihoseini, et al., "A Survey on Implementation and Applications of Full Duplex Wireless Communications", Physical Communication, Jun. 2019, vol. 34, pp. 121-134.

Kolodziej, Kenneth E., et al., "In-Band Full-Duplex Technology: Techniques and Systems Survey", IEEE Transactions on Microwave Theory and Techniques, Jul. 2019, vol. 67, No. 7, pp. 3025-3041.

Qualcomm, "New WID on Enhancements to Integrated Access and Backhaul", RP-193251, 3GPP TSG RAN Meeting #86, Sitges, Spain, Dec. 2019, 6 pages.

* cited by examiner

```
SRS-ResouceSet ::=         SEQUENCE {
    srs-ResouceSetId1      SRS-ResourceSetId,
    srs-ResourceIdList     SEQUENCE (SIZE(1..maxNrofSRS-ResourcesPerSet)) OF SRS-
ResourceId   OPTIONAL,
    ...
    usage                  ENUMERATED {beamManagement, codebook, nonCodebook,
antennaSwitching, FullDuplex},
    ...
    csi-rs-ResouceSetId,              OPTIONAL,
    srs-ResouceSetId2                 OPTIONAL,
    ...
}
```

FIG. 5

| SRS-ResourceSet field descriptions |
|---|
| *srs-ResouceSetId1* |
| If *csi-rs-ResouceSetId2* is not configured, for self-interference estimation by transmitting SRS resources in *srs-ResouceSetId1*, the UE should select CSI-RS resource in *csi-rs-ResouceSetId* as QCL source for determining the spatial domain reception filter, and should select CSI-RS resource in *csi-rs-ResouceSetId* as spatial relation RS for determining spatial domain transmission filter. |
| If *csi-rs-ResouceSetId2* is configured, for self-interference estimation by transmitting SRS resources in *srs-ResouceSetId1*, the UE should select CSI-RS resource in *csi-rs-ResouceSetId2* as QCL source for determining the spatial domain reception filter, and should select SRS resource in *srs-ResouceSetId2* as spatial relation RS for determining spatial domain transmission filter. |
| If *csi-rs-ResouceSetId* is not configured and *srs-ResouceSetId2* is configured, for self-interference estimation by transmitting SRS resources in *srs-ResouceSetId1*, the UE should select SRS resource in *srs-ResouceSetId2* as (reciprocal) QCL source for determining the spatial domain reception filter, and should select SRS resource in *srs-ResouceSetId2* as spatial relation RS for determining spatial domain transmission filter. |

FIG. 6

```
CSI-ReportConfig ::=        SEQUENCE {
    reportConfigId              CSI-ReportConfigId,
    SRS-ResourcesForSelfInterference    SRS-ResourceSetId   OPTIONAL,   -- Need R
    ...
    reportQuantity              CHOICE {
        ssb-Index-RSRP              NULL,
        cri-RI-LI-PMI-CQI           NULL,
        sri-xri-xri-self-interference   NULL,
    },
    ...
}
```

FIG. 7

| CSI-ReportConfig field descriptions |
|---|
| *sri-xri1-xri2-self-interference* <br> The XRI1 and XRI2 to report can be CRI or SRI, depending on the configuration of *csi-rs-ResourceSetId* and *srs-ResourceSetId2*. If *csi-rs-ResourceSetId* is configured and *srs-ResourceSetId2* is not configured, both XRI1 and XRI2 are CRI. If *csi-rs-ResourceSetId* is configured and *srs-ResourceSetId2* is configured, XRI1 is CRI while XRI2 is SRI. If *csi-rs-ResourceSetId* is not configured and *srs-ResourceSetId2* is configured, both XRI1 and XRI2 are SRI. The reported XRI1 and XRI2 are local index within the corresponding configured resource set. |

FIG. 8

| $\mu$ | $Z_1$ [symbols] | | $Z_2$ [symbols] | | $Z_3$ [symbols] | | $Z_4$ [symbols] | |
|---|---|---|---|---|---|---|---|---|
| | $Z_1$ | $Z'_1$ | $Z_2$ | $Z'_2$ | $Z_3$ | $Z'_3$ | $Z_4$ | $Z'_4$ |
| 0 | 22 | 16 | 40 | 37 | 22 | $X_0$ | $\geq$SRS | $\geq X_0$ |
| 1 | 33 | 30 | 72 | 69 | 33 | $X_1$ | $\geq$SRS | $\geq X_1$ |
| 2 | 44 | 42 | 141 | 140 | min(44,$X_2$+$KB_1$) | $X_2$ | $\geq$SRS | $\geq X_2$ |
| 3 | 97 | 85 | 152 | 152 | min(97,$X_3$+$KB2_1$) | $X_3$ | $\geq$SRS | $\geq X_3$ |

| SRS for self-isolation | SRS for cross-interference |
|---|---|
| #1 | #A |
| #2 | #B |
| #3 | #C |

1-1 mapping, same UE Rx beam

FIG. 13A

| SRS for self-isolation | SRS for cross-interference |
|---|---|
| #1 | #A |
| #2 | #B |
| #3 | #C |

No mapping, to report selection

FIG. 13B

METHODS AND SYSTEMS FOR RECEIVE AND TRANSMIT BEAM PAIRING IN FULL DUPLEX SYSTEMS

TECHNICAL FIELD

The present disclosure relates generally to wireless communications, and in particular embodiments, use of receive and transmit beam pairing in full duplex systems.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication. A wired or wireless communication from a first base station to a second base station is referred to as a backhaul communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

In a half-duplex communication system, a transceiver stops receiving while transmitting or stops transmitting while receiving. In a full duplex (FD) communication system, transceivers communicate with each other at the same time, reducing the latency of two-way communications. Some FD schemes allow the transceivers to transmit and receive over different frequency bandwidth, which effectively reduces or eliminates the interference between two parallel links (e.g., from point A to point B, from point B to point A). Some other FD schemes pursue simultaneous bi-directional communication over the same frequency bandwidth and hence provide improved spectrum utilization. The FD schemes over the same or overlapped frequency bandwidth need effective mitigation of self-interference (between the transmitter and receiver of the transceiver).

SUMMARY

Aspects of the present disclosure provide a manner of avoiding a problem of excessive latency and resource consumption due to exhaustive beam searching and pairing for finding an appropriate bi-directional beam pair combination with manageable mutual interference to enable point-to-point FD transmission. Aspects of the present disclosure also provide a solution for enabling multi-user transmission, i.e. by neighboring UEs where one or all UEs are with FD capability and the cross-UE interference raised from FD transmission are measured and taken into account during multi-user pairing.

The terms cross-UE interference and UE cross interference and UE cross interference maybe used interchangeably in the document to mean interference that occurs between transmit and receive beams of neighboring UEs. The self-interference status may be represented by self-interference or self-isolation, which may reflect amount or level of interference. Furthermore, the self-interference and self-isolation that are each referred to in this document generally refer to a similar aspect of how much interference occurs between transmit and receive beams of a same network element such as transmit and receive beams of a UE or transmit and receive beams of a base station. When self-interference is used, it refers to the amount or level of interference. When self-isolation is used, it refers the level of isolation, reflecting the amount or level of interference but in a different measuring direction. For example, when self-interference is high, the self-solation is deemed relatively low; when self-interference is low, the self-isolation is deemed relatively high. Therefore, when one expression is used, it is to be understood that the other term may also apply.

In some embodiments, by allowing the UE to select and report one or more possible transmit and receive beam pairs for FD transmission and corresponding self-interference/isolation levels, it is possible that the transmit and receive beam pairs at the UE that are not suitable for FD transmission will be deprioritized. Furthermore, the transmit and receive beam pairs that provide less self-interference, or better self-isolation, may be prioritized and tested within a first few measurement opportunities. In some embodiments, this may lead to a further reduction in latency and improved resource utilization.

In some embodiments, introducing information sharing via sidelink, i.e. sharing the selected base station transmit beam or UE transmit beam for each SRS for self-interference/isolation estimation, or both, the beam selection at multiple UEs can be better coordinated for the purpose of multi-UE FD transmission. This can potentially increase the success rate of multi-UE FD transmission and lowering latency.

In some embodiments, introducing pre-defined, configured or a reported association between the SRS for self-interference/isolation estimation and the SRS for cross-UE interference measurement, it is possible to improve the interference measurement assumption including UE receive beamforming between the base station and the UEs being served by the base station, which may lead to an improved efficiency for multi-user FD transmissions.

According to some aspects, there is provided a method involving: receiving, by an apparatus, configuration information comprising a set of candidate beams; transmitting, by the apparatus, a reference signal (RS) on a first beam identified in the set of candidate beams; measuring, by the apparatus, interference signal strength of the RS on a second beam identified in the set of candidate beams; determining, by the apparatus, self-interference for the first and second beams based on the measured interference strength signal; selecting an apparatus transmit and apparatus receive beam pair from the set of candidate beams based on the determined self-interference; and transmitting, by the apparatus to a base station, identification of the apparatus transmit and apparatus receive beam pair.

In some embodiments, the set of candidate beams are apparatus transmit and apparatus receive beams that could be used for full duplex communication between the apparatus and the base station.

In some embodiments, the set of candidate beams are based on measurement of at least one of: channel state information reference signals (CSI-RS) received on a plurality of beams at the apparatus; positioning reference signals (PRS) received on a plurality of beams at the apparatus; tracking reference signals (TRS) received on a plurality of beams at the apparatus; synchronization signals/physical broadcast channel (SS/PBCH) resource block received on a plurality of beams at the apparatus; sounding reference signals (SRS) transmitted on a plurality of beams at the apparatus; physical uplink control channel (PUCCH) transmitted on a plurality of beams at the apparatus; or random access channel (RACH) transmitted on a plurality of beams at the apparatus.

In some embodiments, the method further involves: selecting an apparatus receive beam that: is suitable for downlink reception with the base station transmit beam notified by the neighbor UE; or is suitable for downlink reception with a base station transmit beam that is spatially distant from the base station transmit beam notified by the neighbor UE.

In some embodiments, the configuration information identifies a candidate beam in the set of candidate beams by: an angle or a range of angle that the apparatus or the base station, or both, are beamforming to receive from or transmit towards; or a sector number where the apparatus or the base station, or both, are covering by beamforming.

In some embodiments, the computer executable instructions that cause the apparatus to select the apparatus transmit and apparatus receive beam pair from the set of candidate beams, further cause the apparatus to select a apparatus receive beam that: is suitable for downlink reception with the base station transmit beam notified by the neighbor UE; or is suitable for downlink reception with a base station transmit beam that is spatially distant from the base station transmit beam notified by the neighbor UE.

In some embodiments, the configuration information identifies a candidate beam in the set of candidate beams by: an angle or a range of angle that the apparatus or the base station, or both, are beamforming to receive from or transmit towards; or a sector number where the apparatus or the base station, or both, are covering by beamforming.

In some embodiments, the method further involves: receiving, by the apparatus, configuration information for measurement of a channel state information reference signal (CSI-RS) by the apparatus; receiving, by the apparatus, the CSI-RS transmitted by the base station; measuring, by the apparatus, signal strength information pertaining to the CSI-RS; and transmitting, by the apparatus to the base station, the signal strength information.

In some embodiments, the method further involves receiving, by the apparatus, configuration information for transmission of a sounding reference signal (SRS); and transmitting, by the apparatus, the SRS.

According to some aspects, there is provided an apparatus including a processor and a computer-readable medium. The computer-readable medium has stored thereon computer executable instructions, that when executed cause the apparatus to: receive configuration information comprising a set of candidate beams; transmit a reference signal (RS) on a first beam identified in the set of candidate beams; measure interference signal strength of the RS on a second beam identified in the set of candidate beams; determine self-interference for the first and second beams based on the measured interference strength signal; select an apparatus transmit and apparatus receive beam pair from the set of candidate beams based on the determined self-interference; and transmit to a base station identification of the apparatus transmit and apparatus receive beam pair.

In some embodiments, the set of candidate beams are apparatus transmit and apparatus receive beams that could be used for full duplex communication between the apparatus and the base station.

In some embodiments, the set of candidate beams are based on measurement of at least one of: channel state information reference signals (CSI-RS) received on a plurality of beams at the apparatus; positioning reference signals (PRS) received on a plurality of beams at the apparatus; tracking reference signals (TRS) received on a plurality of beams at the apparatus; synchronization signals/physical broadcast channel (SS/PBCH) resource block received on a plurality of beams at the apparatus; sounding reference signals (SRS) transmitted on a plurality of beams at the apparatus; physical uplink control channel (PUCCH) transmitted on a plurality of beams at the apparatus; or random access channel (RACH) transmitted on a plurality of beams at the apparatus.

In some embodiments, the computer executable instructions, when executed, further cause the apparatus to: receive configuration information for measurement of the CSI-RS by the apparatus; receive the CSI-RS transmitted by the base station; measure signal strength information pertaining to the CSI-RS; and transmit to the base station, the signal strength information.

In some embodiments, the computer executable instructions, when executed, further cause the apparatus to receive configuration information for transmission of the SRS; and transmit the SRS.

According to some aspects, there is provided a method involving: transmitting, by a base station, configuration information comprising a set of candidate beams; receiving, by the base station from a user equipment (UE), identification of an UE transmit and UE receive beam pair from the set of candidate beams based on a determined self-interference, the self-interference determined based on isolation interference measured between first and second beams at the UE.

In some embodiments, the method further involves: transmitting, by the base station, configuration information for measurement of the CSI-RS by the UE; transmitting, by the base station, the CSI-RS; receiving, by the base station from the UE, signal strength information measured by the UE; and selecting the set of candidate beams based on the received signal strength information measured by the UE to transmit in the configuration information.

In some embodiments, the method further involves: transmitting, by the base station, configuration information for transmission of the SRS; receiving, by the base station, the SRS; measuring, by the base station, signal strength information pertaining to the SRS; and selecting the set of candidate beams based on the measured signal strength information pertaining to the SRS to transmit in the configuration information.

In some embodiments, the set of candidate beams are UE transmit and UE receive beams that could be used for full duplex communication between the base station and the UE.

In some embodiments, the method further involves: receiving, at the base station, an identification of at least one of: a self-interference or self-isolation value between a UE transmit beam and a UE receive beam of a selected UE transmit and UE receive beam pair; or an occasion or index of reference signal transmission by the apparatus.

In some embodiments, the set of candidate beams based on measurement of at least one of: channel state information reference signals (CSI-RS) transmitted on a plurality of beams at the base station; positioning reference signals (PRS) received on a plurality of beams at the apparatus; tracking reference signals (TRS) received on a plurality of beams at the apparatus; synchronization signals/physical broadcast channel (SS/PBCH) resource block received on a plurality of beams at the apparatus; sounding reference signals (SRS) transmitted on a plurality of beams at the UE;

physical uplink control channel (PUCCH) transmitted on a plurality of beams at the apparatus; or random access channel (RACH) transmitted on a plurality of beams at the apparatus.

In some embodiments, the configuration information identifies a candidate beam in the set of candidate beams by: an angle or a range of angle that the UE or the base station, or both, are beamforming to receive from or transmit towards; or a sector number where the UE or the base station, or both, are covering by beamforming.

According to some aspects, there is provided an apparatus including a processor and a computer-readable medium. The computer-readable medium has stored thereon computer executable instructions, that when executed, cause the apparatus to: transmit configuration information comprising a set of candidate beams; receive from a user equipment (UE), identification of a UE transmit and UE receive beam pair from the set of candidate beams based on a determined highest self-interference, the self-interference determined based on isolation interference measured between first and second beams at the UE.

In some embodiments, the computer executable instructions, when executed, further cause the apparatus to: transmit configuration information for measurement of the CSI-RS by the UE; transmit the CSI-RS; receive from the UE signal strength information measured by the UE; and select the set of candidate beams based on the received signal strength information measured by the UE to transmit in the configuration information.

In some embodiments, the computer executable instructions, when executed, further cause the apparatus to: transmit configuration information for transmission of the SRS; receive the SRS; measure signal strength information pertaining to the SRS; and select the set of candidate beams based on the measured signal strength information pertaining to the SRS to transmit in the configuration information.

In some embodiments, the set of candidate beams are UE transmit and UE receive beams that could be used for full duplex communication between the apparatus and the base station.

In some embodiments, the computer executable instructions, that when executed, further cause the apparatus to receive to the base station an identification of at least one of: a self-interference or self-isolation value between a transmit beam and a receive beam of a selected transmit and receive beam pair; or an occasion or index of reference signal transmission by the apparatus.

In some embodiments, the set of candidate beams that could be used for full duplex communication between the base station and the UE are based on measurement of at least one of: channel state information reference signals (CSI-RS) transmitted on a plurality of beams between the base station and the UE; positioning reference signals (PRS) received on a plurality of beams at the apparatus; tracking reference signals (TRS) received on a plurality of beams at the apparatus; synchronization signals/physical broadcast channel (SS/PBCH) resource block received on a plurality of beams at the apparatus; sounding reference signals (SRS) transmitted on a plurality of beams between the UE and the base station; physical uplink control channel (PUCCH) transmitted on a plurality of beams at the apparatus; or random access channel (RACH) transmitted on a plurality of beams at the apparatus.

In some embodiments, the configuration information identifies a candidate beam in the set of candidate beams by: an angle or a range of angle that the UE or the base station, or both, are beamforming to receive from or transmit towards; or a sector number where the UE or the base station, or both, are covering by beamforming.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 5 is a representation of reference signal configuration information for UEs used as part of a self-interference/isolation estimation process between the transmit and receive beams according to an aspect of the disclosure.

FIG. 6 is a representation of particular fields in the reference signal configuration information of FIG. 5 according to an aspect of the disclosure.

FIG. 7 is a representation of reference signal reporting configuration information for UEs used as part of a self-interference/isolation estimation process between the transmit and receive beams according to an aspect of the disclosure.

FIG. 8 is a representation of particular fields in the reference signal reporting configuration information of FIG. 7 according to an aspect of the disclosure.

FIGS. 13A and 13B are examples of associations of sounding reference signals (SRS) for self-isolation and cross-interference measurements in the case of a one-to-one mapping between the SRS and with no mapping between the SRS.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1A:
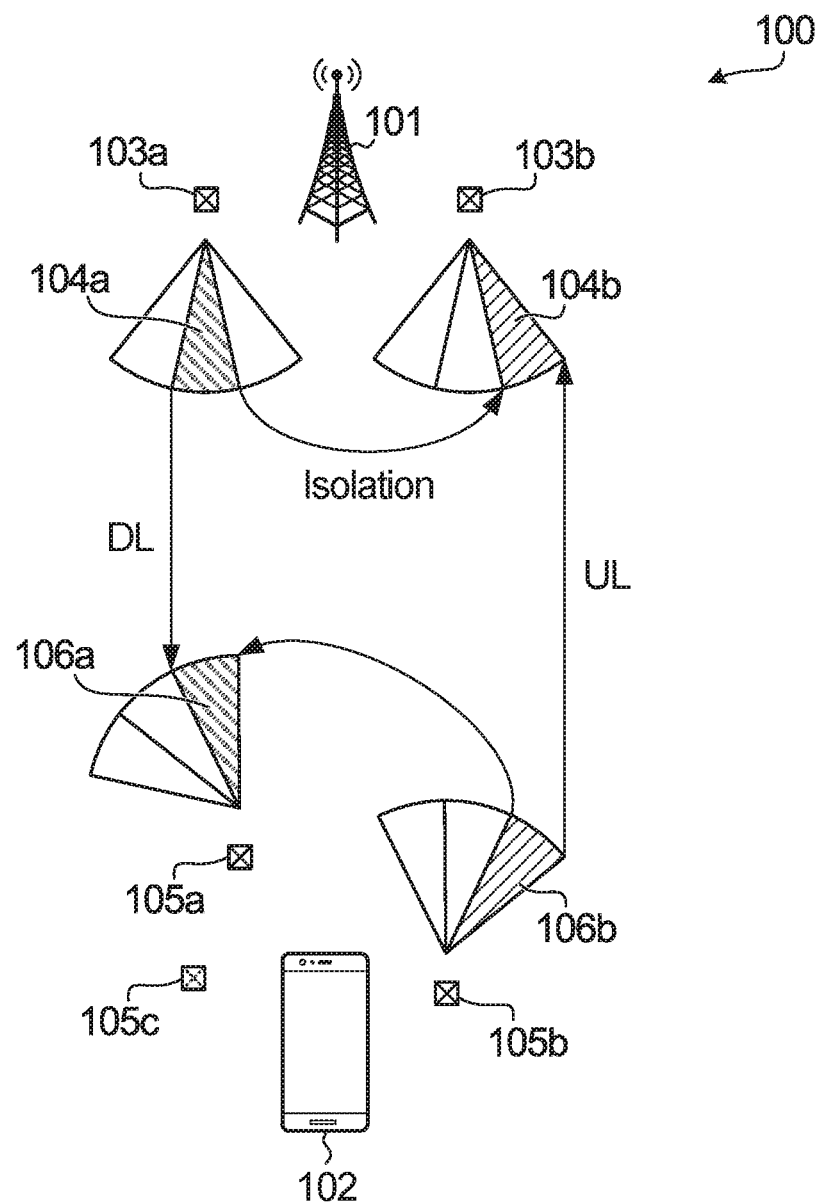
FIG. 1A is a schematic diagram of a full duplex scheme configured to provide isolation between transmit and receive beams.

There are various ways involving self-interference suppression and/or cancellation methods in both the analog and digital domains that have been studied to enable transceivers to transmit and receive simultaneously over the same frequency bandwidth. One particular method, is to apply transmit and receive beamforming, often categorized as in propagation or the analog domain. The key point of such method is to find appropriate beamforming patterns providing manageable cross-direction interference to enable simultaneous bi-directional communications. This is illustrated in FIG. 1A, where FD communication 100 is shown between one base station 101 and one UE 102. The base station 101 is shown having two antenna panels 103a, 103b that each have three beams shown covering a portion of a coverage area. The UE 102 is shown having three antenna panels 105a, 105b, 105c, two of which are shown having three beams shown coving a portion of a coverage area. One base station transmit beam and one UE receive beam is considered a beam pair and one base station receive beam and one UE transmit beam is considered a beam pair. Therefore, two pairs are needed for FD transmission, where one is used for downlink (DL) and the other is used for uplink (UL). A DL channel is shown to include a transmit/receive pair that include base station transmit beam 104a and UE receive beam 106a. A UL channel is shown to include a transmit/receive pair that include UE transmit beam 106b and base station receive beam 104b. There is some level of isolation between base station transmit beam 104a and base station receive beam 104b as these two beams are directed in different directions. There is some level of isolation between UE transmit beam 106a and UE receive beam 106b as these two beams are directed in different directions.

While the case of BS-to-UE transmission is shown as an example, the concept of FD can naturally be extended to BS-to-BS (backhaul) or UE-to-UE (sidelink) cases.

Furthermore, unless otherwise stated, it is assumed that when UEs are referred to in this description, they are FD capable UEs, that is UEs that are enabled to perform full duplex functionality. UEs that are enabled to perform full duplex functionality are also typically able to perform half duplex functionality. When UEs are indicated to be non-FD capable, they are at least capable of half duplex.

Figure 1B:
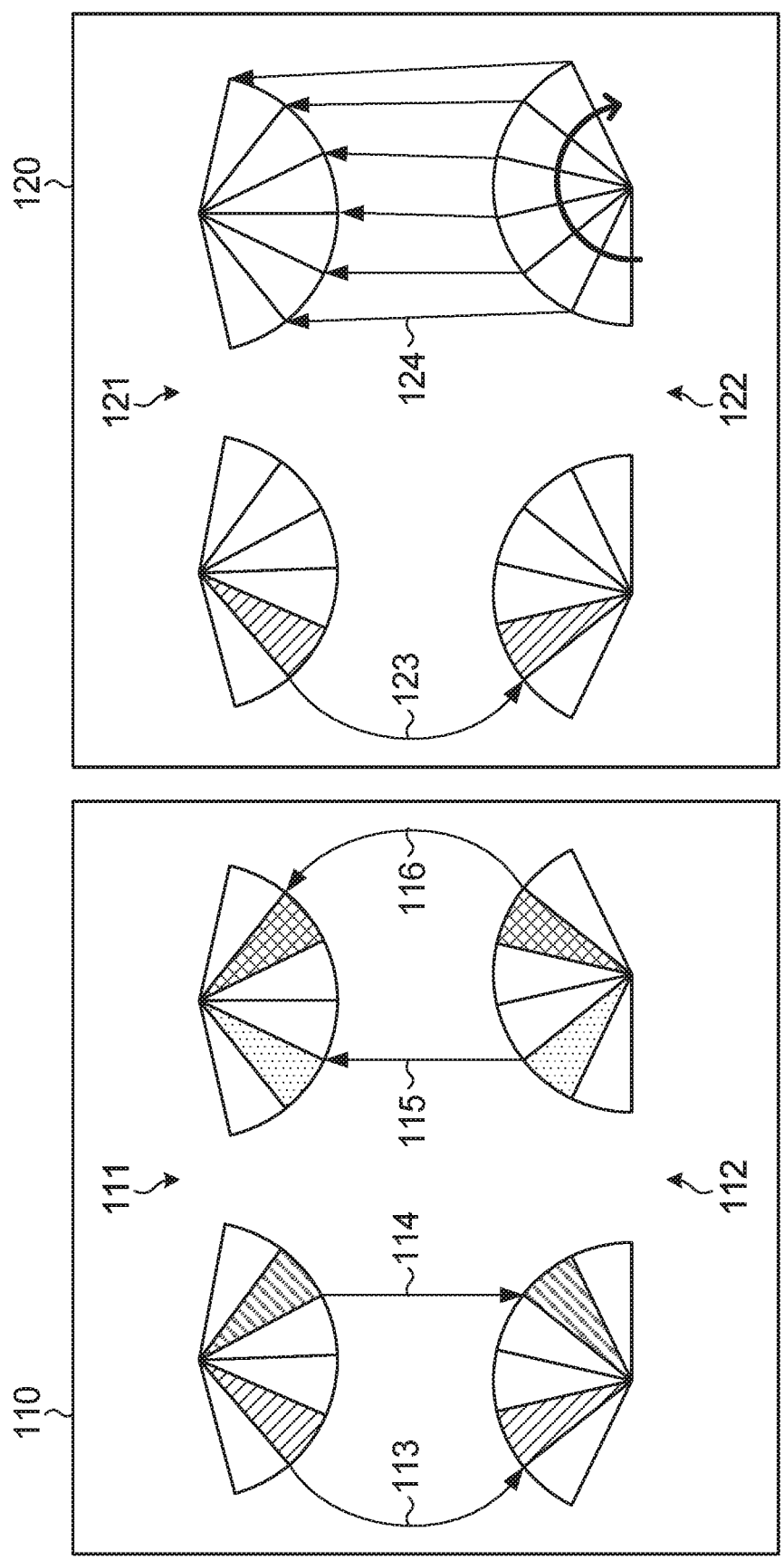
FIG. 1B includes schematic diagrams of two examples of full duplex schemes for selecting beam pairs that provide isolation between transmit and receive beams.
Figure 1C:
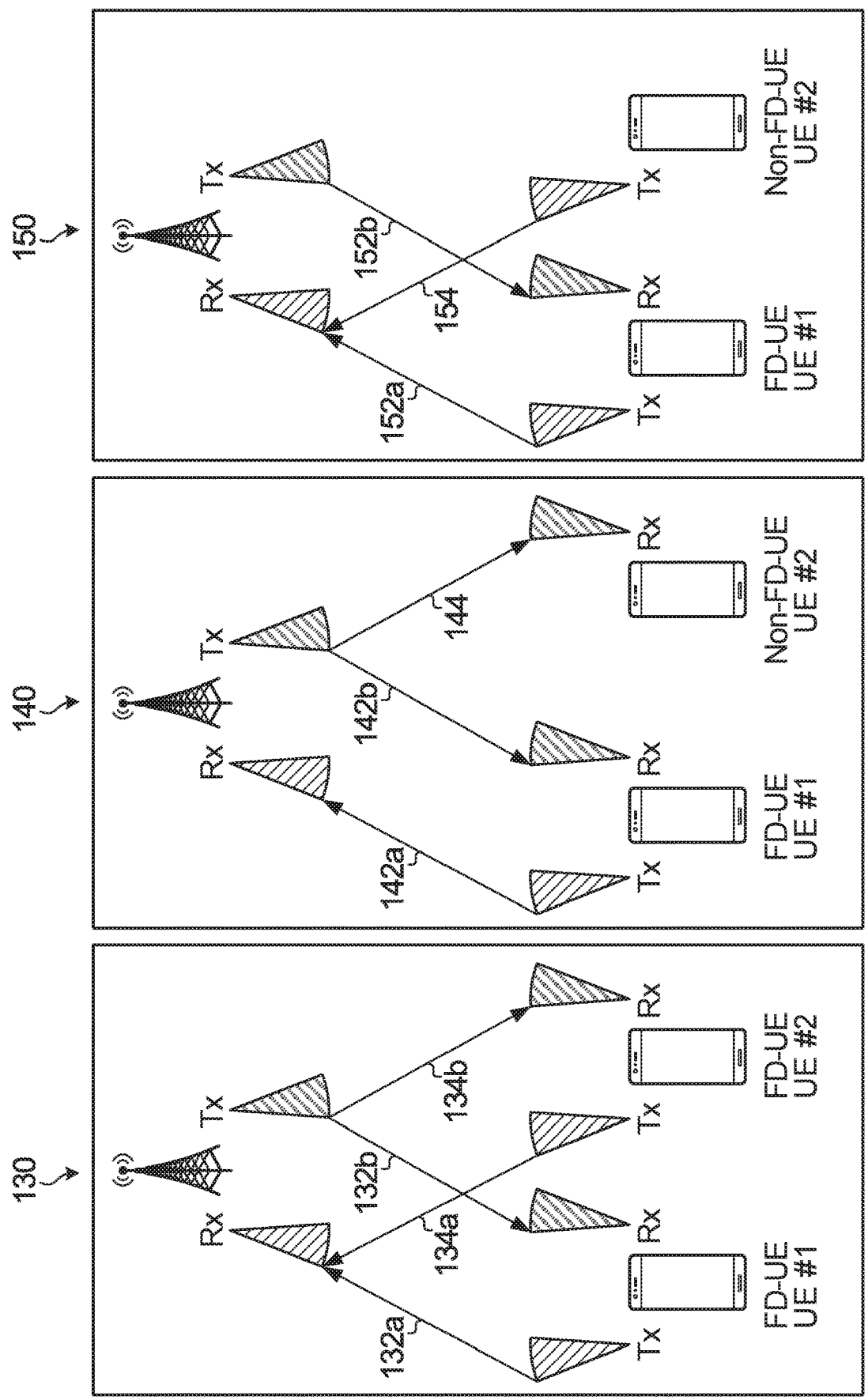
FIG. 1C includes schematic diagrams of a base station and UEs that are either full duplex capable or half duplex capable configured to provide isolation between transmit and receive beams.

There are several straightforward solutions that can be considered to enable FD. One solution is to exhaust all possible combinations of beam pairs between the transceivers, and find the most suitable combination of beam pairs. This solution is overwhelming in terms of time and resource consumption. FIG. 1B shows this described solution 110 in which a base station 111 has beams associated with two antenna panels and a UE 112 has beams associated with two antenna panels. Transmit/receive beams pairs are determined for DL 113 and 114 with suitable isolation between the transmit beam and receive beam at the base station and at the UE. Transmit/receive beams pairs are determined for UL 115 and 116 with suitable isolation between the transmit beam and receive beam at the base station and at the UE. This method is more suitable for feasibility verification in a laboratory, which is stationary and there is sufficient time to finish such exhaustive searching.

Another solution is to let one transceiver dictate the beam pair for one direction (based on previous beam training for this direction), and then leaving the choice of the beam pair for the other direction to the other party in the communication. This method is likely to be able to provide high suppression of self-interference, but with less guarantee on the quality of service (QoS) on the other direction and the flexibility of beam pairing may also be somewhat restricted. FIG. 1B shows this described solution 120 in which a base station 121 has beams associated with two antenna panels and a UE 122 has beams associated with two antenna panels. A transmit/receive beam pair is determined for DL 123 for one transmit/receive beam pair for the first antenna panel. A transmit/receive beam pair is determined from the various beams options shown for UL 124 as a single transmit/receive beam pair for the second antenna panel to enable suitable isolation between the base station transmit beam of the first base station antenna panel and base station receive beam of the second base station antenna panel and the UE receive beam of the first UE antenna panel and UE transmit beam of the second UE antenna panel.

Figures 9, 10:
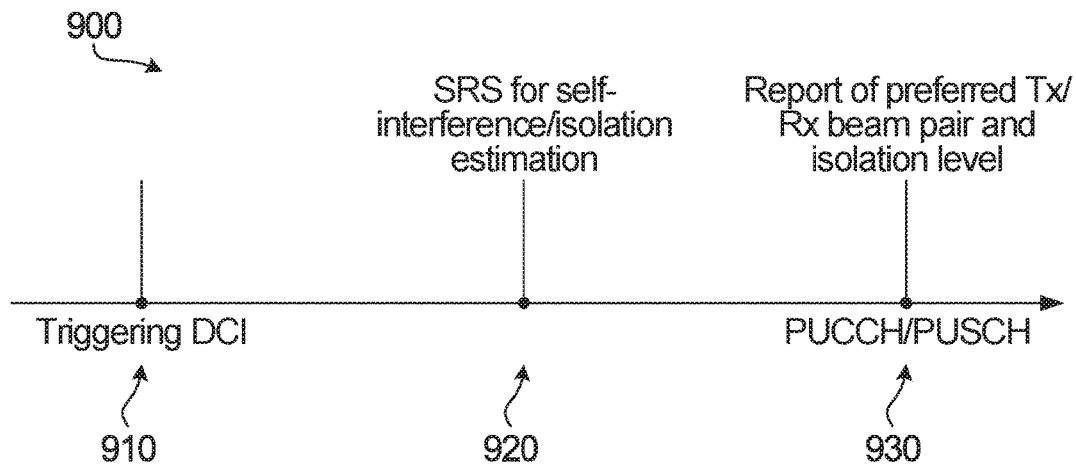
FIG. 9 is an example of timing for performing self-interference/isolation estimation and reporting the transmit and receive beam selection based on the self-interference/isolation estimation according to a further aspect of the application.
FIG. 10 is a table including example values of a minimum number of orthogonal frequency division multiplexed (OFDM) symbols between particular instances during a process of self-interference/isolation estimation and reporting of a corresponding self-interference/isolation report.

In cellular communication systems with one base station serving multiple UEs, as a means to improve overall system capacity, multi-user concurrent transmission where the base station transmits to, or receives from, multiple UEs simultaneously is becoming more and more popular. When the base station and the UE are both capable of FD transmission, there has not been a solution available for enabling UE pairing considering UE-to-UE interference, which results from simultaneous transmission and reception of multiple UEs and does not exist in half-duplex multi-user transmissions where UEs are either all receiving or all transmitting. FIG. 10 illustrates an example 130 of a base station having transmit and receive beams and two FD capable UEs, UE #1 and UE #2, that each have respective transmit and receive beams. Because the UEs are capable of FD, each of the UEs is shown to have a UE transmit/receive beam pair, UE #1 having one UE transmit/receive beam pair for DL 132b,134b and UE #2 having one transmit/receive beam pair for UL 132a,134a. It is also possible that not all of the UEs being served by a base station would be able to support FD transmission. Therefore, pairing FD enabled and non-FD enabled UEs should be considered. FIG. 10 illustrates an example 140 of a base station having transmit and receive beams and one FD capable UE, UE #1, having transmit and receive beams and one UE that is not FD capable, UE #2, having a receive beam. The FD capable UE is shown to be using one UE transmit/receive beam pair for DL 142b and one transmit/receive beam pair for UL 142a, while the UE #2 that is not FD capable is only able of DL 144 from the base station on a beam pair including the base station transmit beam and the UE receive beam. Example 150 illustrates the situation in which the FD capable UE. UE #1, is able to transmit and receive simultaneously on UE transmit/receive beam pairs for DL 152b and UL 152a and the UE that is not FD capable, UE #2, can perform UL 154 from the base station on a beam pair including the UE transmit beam and base station receive beam.

Aspects of the present disclosure provide a manner of avoiding a problem of excessive latency and resource consumption due to exhaustive beam searching and pairing for finding an appropriate bi-directional beam pair combination with manageable mutual interference to enable point-to-point FD transmission. Aspects of the present disclosure also provide a solution for enabling multi-user transmission where one or all UEs are with FD capability and the cross-UE interference raised from FD transmission are measured and taken into account during multi-user pairing.

Figure 2:
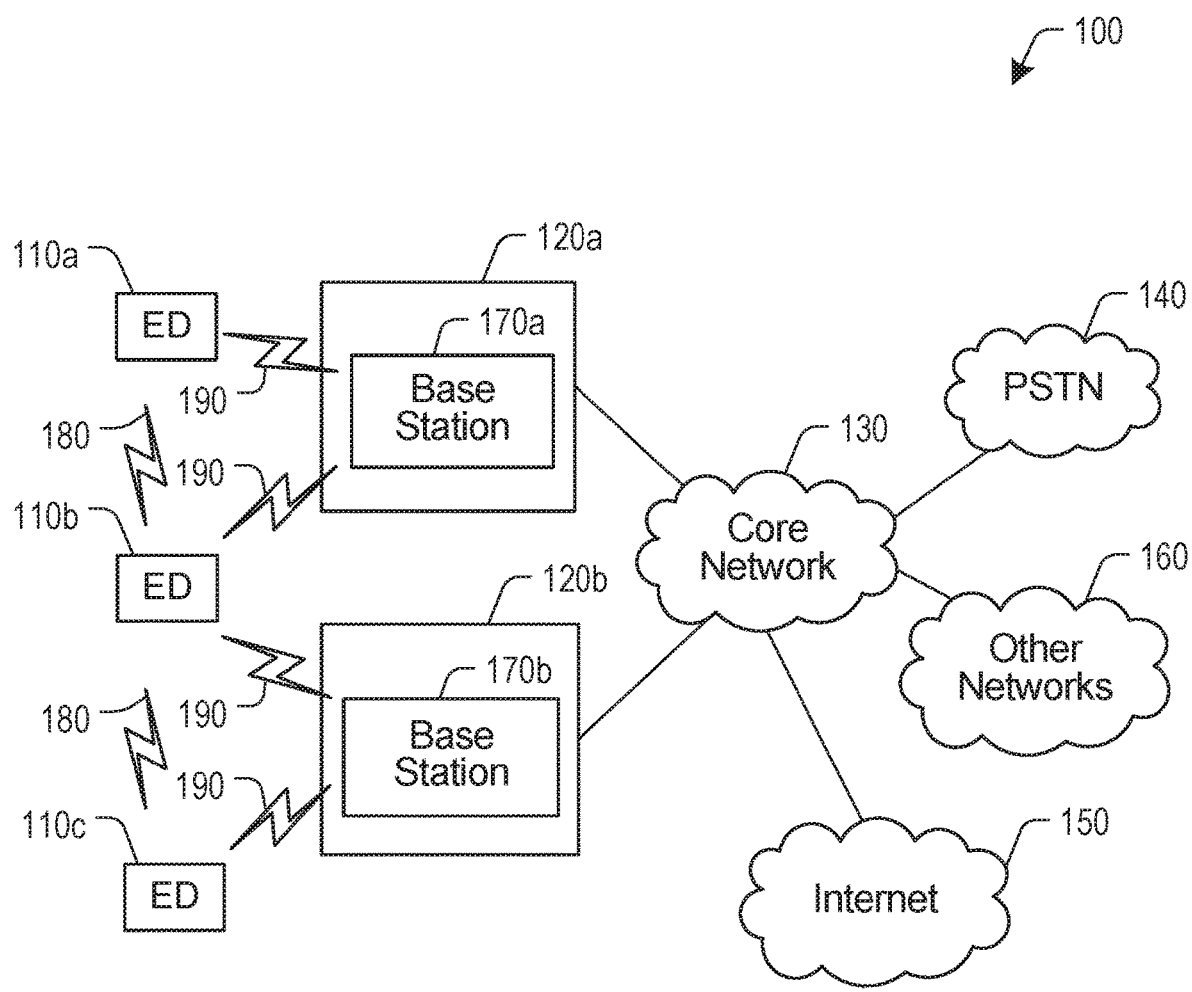
FIG. 2 is a schematic diagram of a communication system in which embodiments of the disclosure may occur.
Figure 3A:
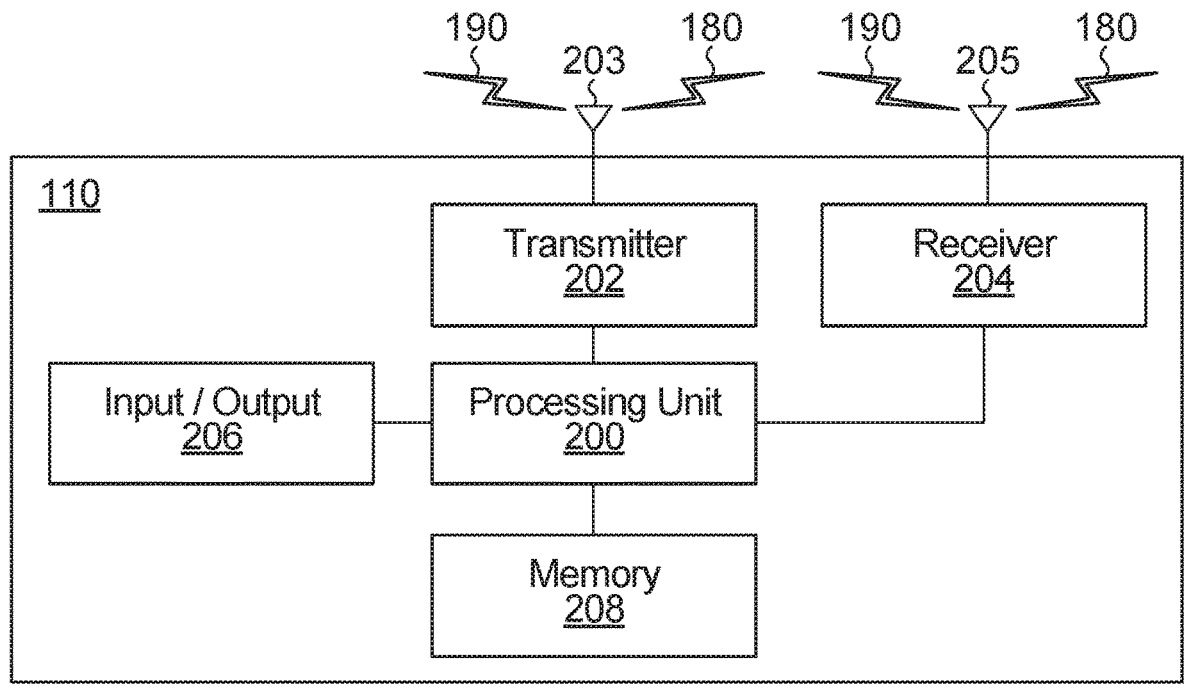
FIG. 3A is a block diagram of an example user equipment and FIGS. 3B and 3C are block diagrams of example base stations.
Figure 3B:
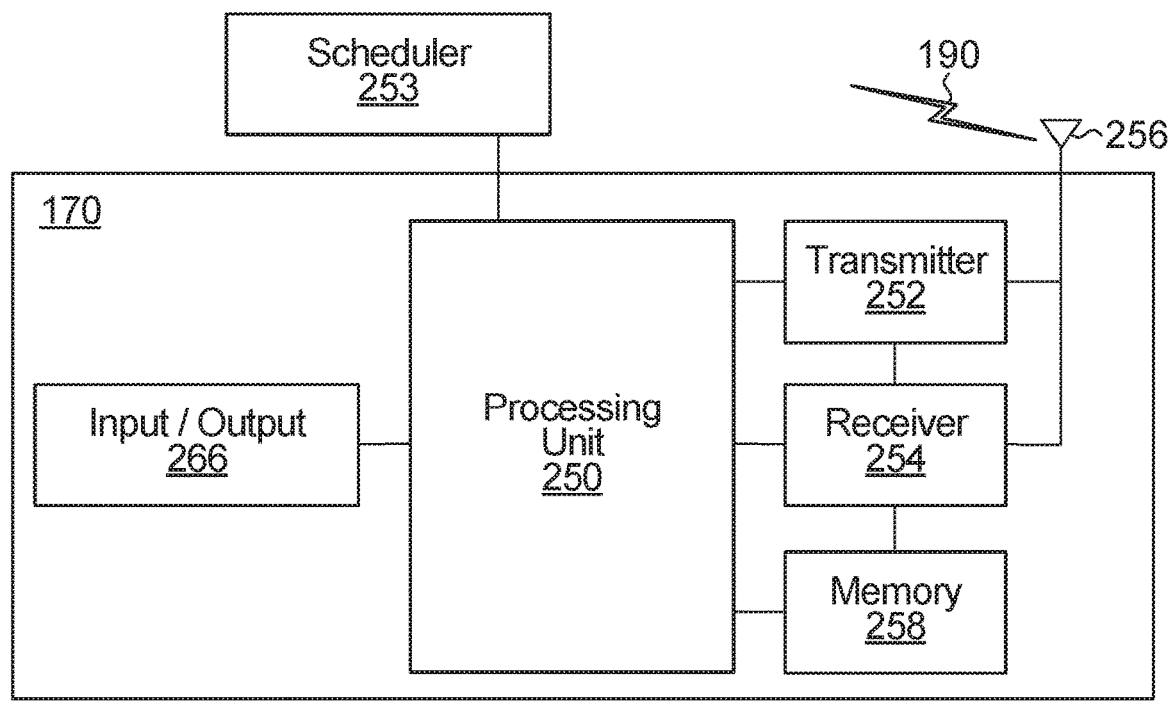

FIGS. 2, 3A, and 3B following below provide context for the network and device that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth. [007o] In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (VVTRU), mobile station, mobile subscriber unit, cellular telephone, station (STA), machine type communication device (MTC), personal digital assistant (PDA), smartphone, laptop, computer, touchpad, wireless sensor, consumer electronics device, Internet of Things (loT) device, wearable device, or vehicular device (or vehicle-mounted device, vehicle on-board equipment).

FIG. 2 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (VVTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 3C:
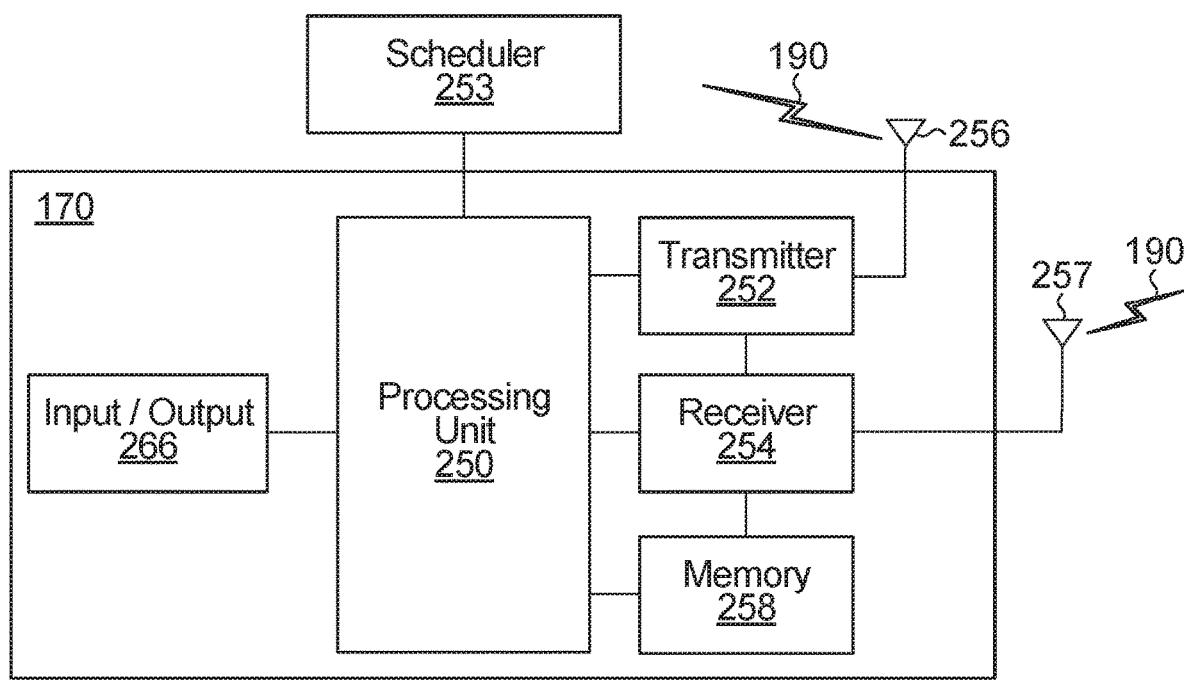

FIGS. 3A, 3B and 3C illustrate example devices that may implement the methods and teachings according to this disclosure. In particular, FIG. 3A illustrates an example ED 110, and FIGS. 3B and 3C each illustrate example base stations 170. These components could be used in the system 100 or in any other suitable system.

As shown in FIG. 3A, the ED 110 includes at least one processing unit or processor 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes a transmitter 202. The transmitter 202 is configured to modulate data or other content for transmission by at least one antenna or Network Interface Controller (NIC) 204. The ED 110 also includes a receiver 204. The receiver 204 is configured to demodulate data or other content received by at least one antenna 205. The transmitter 202 and receiver 204 includes any suitable structure for generating signals for wireless or wired transmission and/or processing signals received wirelessly or by wire. Each antenna 204 and 205 each includes any suitable structure for transmitting (antenna 204) and/or receiving (antenna 205) wireless or wired signals. One or multiple transmitters 202 and receivers 204 could be used in the ED 110. One or multiple transmit antennas 204 or receive antennas 205 could be used in the ED 110. One or more of the antennas 204,205 may each have one or more antenna panels. Although shown as a separate transmitter and receiver functional units, these devices could also be implemented using at least one transceiver. While FIG. 3A illustrates the base station including two antennas, in other embodiments, both the transmitter and receiver, or a transceiver, may be connected to a single antenna, having one or more antenna panels.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit or processor 250, at least one transmitter 252, at least one receiver 254, one or more antennas 256, at least one memory 258, and one or more input/output devices or interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

FIG. 3C in another version of the base station 170 that shows many of the same elements as FIG. 3B. In particular, the base station 170 includes at least one processing unit 250, at least one transmitter 252, at least one receiver 254, at least one memory 258, and one or more input/output devices or interfaces 266. A scheduler 253 may be coupled to the processing unit 250. The main difference between FIGS. 3B and 3C is that there are two antennas 256,257, one coupled to each of the transmitter 252 and the receiver 254, respectively. The same numbered elements in the two figures have similar functionality.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each of the antennas 256,257 includes any suitable structure for transmitting (antenna 256) and/or receiving (antenna 257) wireless or wired signals. Although a single transmit antenna 256 is shown coupled to the transmitter 252 and a single receive antenna 257 is shown coupled to the receiver 254, more than one antenna could be coupled to either the transmitter 252 or the receiver 254. Furthermore, each antenna 256, 257 may include one or more antenna panels.

Additional details regarding the UEs 110 and the base stations 170 are known to those of skill in the art. As such, these details are omitted here for clarity.

In existing 3GPP specifications, a beamforming behavior at the base station side is often unspecified, while the beamforming behavior at the UE side is often captured with more details. The concept of a beam pair consisting of one beam at the base station and one beam at the UE was used above and in FIG. 1A for illustration purposes. Aspects of the following description will describe the beamforming behavior at the UE side and beam pairing mainly refers to pairing the transmit beam and receive beam at the UE side.

Figure 4:
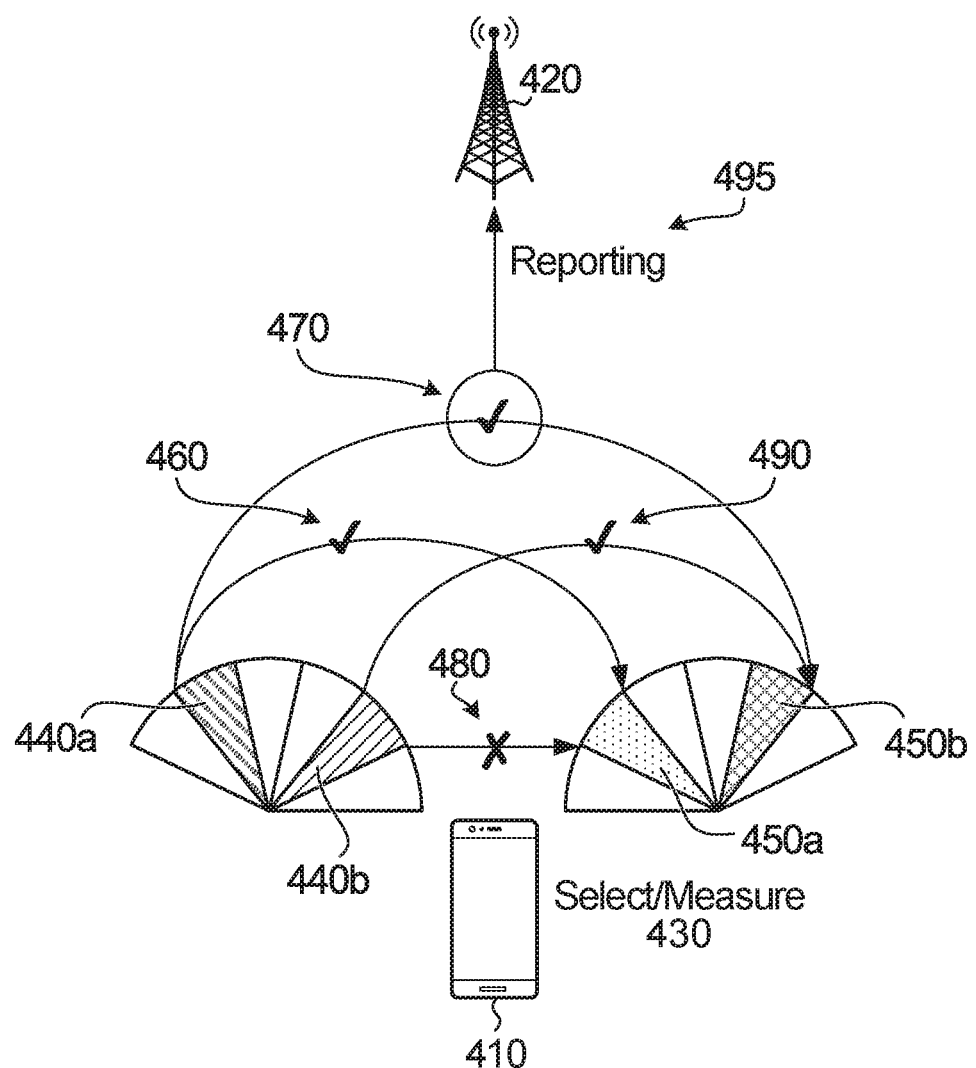
FIG. 4 is a schematic diagram of a full duplex scheme configured to provide isolation between the downlink (DL) and uplink (UL) channels according to an aspect of the disclosure.

Referring now to the arrangement of FIG. 4, the figure includes a UE 410 illustrated to have two antenna panels that can transmit or receive on multiple beams and a base station 420. While not shown in FIG. 4, the base station 420 may also have multiple antenna panels each having multiple transmit and receive beams, as shown for example in FIG. 1A. In some embodiments, the following functionality can be performed to find an appropriate transmit and receive beam pair at the UE for FD transmission for point-to-point transmission.

1. The base station shares a candidate beam set that include an identification of one or more beams with the UE. The candidate beam set is selected based on previous beam training results performed with the UE and/or the current interference situation, so as to allow an exhaustive search over all possible combinations of beams at the base station and the UE to be avoided, thereby reducing latency and improving resource utilization.
2. The UE selects 430 two beams, for example a first beam and a second beam, among the candidate beam set provided by the base station, one is for reception and the other is for transmission from the UE perspective.

The UE then transmits a reference signal on a first beam, which is transmit beam 440*a*, an example of which is a sounding reference signal (SRS). Transmission on transmit beam 440*a* can be measured on a second beam identified in the candidate beam set, which is receive beam 450*a* to determine self-interference 460 and on another second beam, receive beam 450*b*, to determine self-interference 470. Transmission on another first beam, transmit beam 440*b*, can be measured on receive beam 450*a* to determine self-interference 480 and on receive beam 450*b* to determine self-interference 490. By measuring the level of self-interference or self-isolation, the UE can determine which beam pairs lead to strong self-interference, and can therefore be ruled out as further candidates, and the beam pairs that have better self-isolation. In this case the worst self-interference appears to be between beams 440*b* and 450*a* and best self-isolation appears to be between beams 440*a* and 450*b*.

3. Based on the measured results, the UE reports 495 the selected beams for transmission and reception respectively, and the measured level of self-interference or self-isolation, so to facilitate future FD transmission with the base station. In some embodiments, a preferred occasion of SRS transmission may also be reported to the base station.

When multiple UEs may be communicating with a same base station, additional functionality may be provided that enables the UEs to determine cross-UE interference and facilitate multi-UE FD pairing with the base station. Examples the additional functionality may include:

1. Via sidelink transmission between two UEs, one UE shares information on a selected base station transmit beam and thereby corresponding UE receive beam for receiving SRS for self-interference/isolation estimation, so as to facilitate neighbor UEs to measure cross-UE interference by applying the receive beam that can be used to receive from the same base station transmit beam to receive the SRS transmission from the UE, which can for example enable the base station to use the same transmit beam to transmit towards those UEs.
2. Via sidelink, one UE shares information on selected base station transmit beam and thereby corresponding UE receive beam for receiving SRS for self-interference/isolation estimation, so as to facilitate neighbor UEs to measure cross-UE interference by applying the receive beam that can be used to receive from the base station transmit beam that is spatially distant from the base station transmit beam to receive the SRS transmission from the UE, which can for example enable the BS to use spatially distant transmit beams to transmit towards those UEs.
3. Via sidelink, the UE shares information on selected UE transmit beams, among those previously applied in sidelink beam training, for transmitting the SRS for self-interference/isolation estimation, so as to facilitate neighbor UEs to select the receive beam for measuring and mitigating cross-UE interference with potential interference avoidance schemes applied.
4. From one UE perspective, for a given combination of SRS for self-interference/isolation estimation for this UE and SRS for cross-UE interference measurement (containing SRS configuration of neighbor UEs), the UE reports to the base station about the measured cross-UE interference, where the association between SRS for self-interference/isolation estimation and SRS for cross-UE interference measurement can also be proactively selected and reported by the UE.

Methods of acquiring UE transmit and receive beam pairs with manageable cross-direction interference for enabling point-to-point FD transmission will now be described in detail.

Measurement Configuration

As a preliminary step to what is described above as the functionality occurring between a base station and a UE to determine transmit/receive beam pairs with reduced self-interference, it is assumed that beam training, has been performed for the base station-to-UE link (DL) or for the UE-to-base station link (UL), or both. Beam training may include the process of acquiring the beam(s) at the base station and/or the UE that can be used for communication between the base station and UE. The beam training results for DL are reported from the UE to the base station via beam reporting, where one or more of resource indication information, such as synchronization signals/physical broadcast channel (SS/PBCH) resource block indicator (SSBRI) or channel state information reference signal (CSI-RS) resource indicator (CRI) and corresponding layer 1—reference signal received power/signal interference to noise ratio (L1-RSRP/SINR) are provided. Here SSBRI and CRI represents the selected transmit beam at the base station side. In some embodiments, for given base station transmit beams, if there is no explicit indication from the base station about which UE receive beam should be used, the UE may select receive beams, measure a respective corresponding signal strength and send feedback to the base station. In such a situation, the reported SSBRI/CRI represents the selected base station transmit beam and UE receive beam, which is known at the UE only. After getting the SSBRI/CRI, the base station knows which beam to use to transmit to the UE. For future transmission, if the base station indicates the previously reported SSB/CSI-RS for the UE to determine the receive beam, the UE knows it should be using the corresponding receive beam, or a similar receive beam. L1-RSPR/SINR represents the observed channel quality given the selected base station transmit beam and possibly an associated UE receive beam. The L1-RSPR/SINR is either determined by the UE itself or indicated to the UE by the base station. The beam training results for UL are known to the base station via previous transmissions of sounding reference signal (SRS) and the corresponding channel quality measurements, which can be selected by the base station and indicated to the UE for subsequent transmissions.

For FD transmission, to enable UE transmit and receive beam pairing for UL and DL, in which the beam pair is a UE transmit beam and a UE receive beam, and estimation of self-interference/self-isolation at the UE, the base station configures SRS transmission for the UE. An example of the information element (IE) that may be used to configure the SRS is an IE of SRS resource set (srs-ResourceSet) which is shown in FIG. 5. An IE is a group of fields for different information which may be included within a signaling message or data flow and sent across a communication interface. A field in the srs-ResourceSet IE is a SRS resource set ID (srs-ResourceSetId1) field that indicates an identifier (ID) of a set of SRS resource(s) that can be used for self-interference/isolation estimation. Another field in the srs-ResourceSet IE is a SRS resource ID list (srs-ResourceIdList) field that identifies the IDs of SRS resources contained in the SRS resource set with an ID of srs-ResourceSetId1, which can be used for self-interference/isolation estimation.

It is expected the UE may use a transmit beam to transmit a configured SRS and receive the transmitted SRS on a receive beam at the same time. In this way, the self-interference, or equivalently the level of self-isolation, can be measured. By comparing different combinations of transmit and receive beams at the UE, a pair of UE transmit and UE receive beams that provide manageable self-interference, or satisfactory self-isolation, can be identified. However, given that the number of different UE transmit and UE receive beams at the UE can be somewhat large, it would take many SRS transmission opportunities to perform the SRS transmissions to exhaust all the possible combinations, leading to a large delay and resource overhead. Instead of letting the UE exhaust all possible combinations of transmit and receive beams at the UE, the base station can provide assistance information to restrict UE transmit and receive beam selection to a candidate beam set. This candidate beam set can be formed utilizing previous DL and UL beam training results. The candidate beam sent can include one or multiple UE transmit beams or one or multiple UE receive beams, or both for the eventual selection of a UE transmit and UE receive beam pair. For example, by selecting beam candidates with L1-RSRP/SINR values above a certain threshold. As shown in FIG. 5, an example IE for configuring SRS for self-interference/isolation estimation may include additional optional fields such as a CSI-RS resource set ID (csi-rs-ResourceSetId) field and a SRS resource set ID (srs-ResourceSetId2) field that indicate IDs of CSI-RS and SRS resource(s) that can be used to identify candidate UE transmit and receive beams. It is noted that the srs-ResourceSetId1 and srs-ResourceSetId2 are two exemplary names of the fields for resource set. The fields could be in other names may distinguish the resource sets.

Whether the UE can generate a transmit beam that is exactly the same (or within a certain error margin under certain probability) as a receive beam is referred to as whether beam correspondence (BC) holds at the UE or not. With BC, the SS/PBCH or CSI-RS represented by SSBRI/CRI that is reported in the previously performed DL beam reporting can be used to indicate the transmit beam for UL transmission. Without BC, UL beam training is often needed, and the SRS representing the transmit beam selected from UL beam training can be used to indicate the transmit beam for UL transmission. Depending on whether BC occurs at the UE or not, the candidate beam set mentioned above can be conveyed from the base station to the UE in different manners.

If BC holds, for the SRS for self-interference/isolation estimation, the base station can indicate to the UE a set of SSB and/or CSI-RS, which are likely derived from the previously performed DL beam reporting. This indication provides the candidate beam set for the UE to select from for transmitting and receiving each of the SRS for self-interference/isolation estimation. These previously reported SSB or CSI-RS implicitly represent the associated UE receive beams (and also transmit beam because of BC) at the UE. This example is illustrated in the first paragraph of the SRS-ResourceSet field descriptions of FIG. 6. Alternatively, the base station can indicate to the UE a set of SRS, which are likely derived from the previously performed UL beam training. The BS is allowed to configure UL beam training regardless of the BC status of the UE. The indication provides a candidate beam set for UE to select from for transmitting and receiving each of the SRS for self-interference/isolation estimation, as these previously transmitted SRS implicitly represent the associated UE transmit (Tx) beams (and also the receive beam because of BC) at the UE. This example is illustrated in the third paragraph of FIG. 6.

When BC does not hold, for the SRS to be used to determine self-interference/isolation estimation, the base station can indicate to the UE a set of SSB and/or CSI-RS, which are likely derived from the previously performed DL beam reporting, and a set of SRS, which are likely derived from previously performed UL beam training. The indicated SSB(s) and/or CSI-RS(s) are to provide the UE a candidate receive beam set for the UE to select from for receiving each of the SRS for self-interference/isolation estimation. The previously reported SSB or CSI-RS implicitly represent the associated UE receive beams at the UE. The indicated SRS(s) are to provide UE a candidate Tx beam set for UE to select for transmitting each of the SRS for self-interference/isolation estimation, as these (previously transmitted) SRS implicitly represent the associated UE Tx beam at this UE. This example is illustrated in the second paragraph of FIG. 6.

With such candidate beam set information received at the UE, it is expected that the UE receive or UE transmit beams that are not suitable for reception or transmission with the base station will be filtered out, leading to improved resource utilization compared with a blind exhaustive search at the UE side. In some embodiments, the UE will take initiative to prioritize the UE transmit and UE receive beam pairs that will likely lead to lower self-interference and high self-isolation, and which are more suitable for FD transmission, with which the chance of finding a proper UE transmit and UE receive beam pair may be faster than that performed by a blind network configuration.

During the above-mentioned process, if the UE panel information is available, the UE may be allowed to select UE transmit and UE receive beams for FD transmission from different UE panels, i.e., the CSI-RS or SRS provided for SRS for self-interference/isolation estimation representing different UE receive or UE transmit beams come from, or are mapped to different UE panels. The UE panel information may be provided by the UE to the base station in DL beam reporting and that indicates a base station transmit beam selected from the candidate set that is measured on the UE panel, or indicated by the base station to UE in UL beam training and that indicates a request for the UE to send SRS from a certain UE panel.

Processing and Reporting

For each of one or more beams of the candidate list, after transmitting and receiving the SRS, the UE measures self-interference/isolation from the transmitted and received SRS. The UE then selects one or more of the candidate beams of the candidate beam set that provides manageable self-interference or satisfactory self-isolation. The selecting of the one or more beams, which may include transmit and receive beams that collectively could be considered a transmit and receive beam pair, may be based on a transmit and receive beam pair with a highest self-isolation, a transmit and receive beam pair with a self-isolation not less than a threshold value, a transmit and receive beam pair with a lowest self-interference, or a transmit and receive beam pair with a self-interference not more than a threshold value. Based on these selection options, the one or more beams may include, for example, one beam pair if only the highest self-isolation or lowest self-interference is the basis of the selection, or multiple beam pairs if there are multiple beam pairs that have a self-isolation not less than a threshold value or a self-interference not more than a threshold value.

One or multiple choices of the selected SRS, the corresponding selected UE transmit and receive beams, the measured self-interference/isolation can be shared with the base station, so as to facilitate scheduling of FD transmissions. In some embodiments, information that is shared with the base station may include a self-interference or self-isolation value between a transmit beam and a receive beam of a selected transmit and receive beam pair. In some embodiments, information that is shared with the base station may include an occasion or an index value of a reference signal transmission as described in further detail below.

A possible way for the base station to configure the UE to perform reporting is using a IE such as the CSI report configuration (CSI-ReportConfig) IE shown in FIG. 7. A SRS resource for self-interference (SRS-ResourcesForSelfInterference) field defining the resources used to determine self-interference is included in the CSI-ReportConfig IE and where the report quality (report Quantity) field is set to sri-xri-xri-self-interference, where XRI stands for either SSBRI or CRI or SRS resource indicator (SRI). The reason behind this is the contents to be reported would depend on how the candidate beam set is conveyed to the UE, by {SSB and/or CSI-RS}, {SSB and/or CSI-RS+SRS}, or {SRS}. Such dependency is briefly described in FIG. 8, and it is also noted that XRI to be reported is a relative index among these configured by the base station via csi-rs-ResouceSetId and srs-ResouceSetId2 in FIG. 5.

Referring to FIG. 9, which illustrates a series of events 900 occurring over a duration of time for selection of candidate beams, SRS self-interference estimate and reporting of a candidate selection by the UE, it can be seen that a transmission of SRS for self-interference/isolation estimation is triggered 910 by dynamic signaling by a DCI. After a particular time duration, that involves the UE selecting a UE transmit and UE receive beam from the candidate beam set, the UE transmits 920 the SRS. The particular time duration may be longer than when an SRS is triggered for other purposes, such as UL CSI acquisition. Another possible reason for the larger delay than regular SRS triggering is that the UE may need to wake up certain previously deactivated antenna panels for the selected UE transmit and UE receive beam pairing. The particular time duration may be captured as a triggering offset between the DCI and the transmission of the SRS. In some embodiments, the minimum delay between the DCI and the transmission of the SRS for self-interference/isolation estimation may be reported by the UE during UE capability reporting. In some embodiments, the triggering offset may be pre-configured with several candidate values, and then dynamically selected in the triggering DCI. In some embodiments, the minimum UE capability value or the minimum configured triggering offset for SRS for self-interference/isolation estimation, or both, is larger than that for SRS triggered for other purposes, respectively, so to ensure enough time is given to the UE for proper processing.

FIG. 9 illustrates the process for performing a self-interference/isolation estimation for a single candidate transmit and receive beam pair. Self-interference/isolation estimation can be performed for other candidate pairs subsequent to the first estimation 910, 920.

After the self-interference/isolation estimation has been performed for one or more candidates of the candidate set, the UE reports 930 one or more selected beam pairs to the network on a physical uplink control channel (PUCCH) or a physical uplink shared channel (PUSCH). The reporting may include such information as the selected SRS, one or more UE transmit and receive beam pairs, and one or more self-interference/isolation measurements. In some embodiments, a longer processing delay occurs between when the SRS is transmitted for self-interference/isolation estimation and when preparing and transmitting the report to the network as compared with a simple L1-RSRP measurement with SSB or CSI-RS sent from the base station and received at the UE with pre-informed BS Tx beam and UE receive (Rx) beam. One reason for this is that while sending from one transmit panel with a transmit beam, the UE may have turned on multiple receive panels with different receive beams, of which the UE needs to select one out of multiple receive panels/beams. To allow sufficient time to the UE, in some embodiments, the minimum delay between SRS transmission and associated report and/or that between triggering DCI and associated report may be restricted to be larger than those for conventional L1-RSRP or L1-SINR reporting. Since these parameter values may be reported as part of the UE capability, the minimum UE capability or the candidate values configured for DCI down-selection, or both, are expected to be larger than those for L1-RSRP or L1-SINR reporting. This possible implementation is illustrated in FIG. 10, where the variables $Z_3$ 1010 and $Z_3'$ 1020 are representative of minimum numbers of OFDM symbols between a last symbol of a physical downlink control channel (PDCCH) carrying a triggering DCI and a first symbol of an L1-RSRP report for a corresponding SSB or CSI-RS and between a last symbol of the SSB or CSI-RS and a first symbol of a corresponding L1-RSRP report, respectively. The variables $Z_4$ 1030 and $Z_4'$ 1040 are representative of minimum numbers of OFDM symbols between a last symbol of a PDCCH carrying a triggering DCI and a first symbol of a self-interference/isolation report for SRS and between a last symbol of the SRS for self-interference/isolation estimation and a first symbol of a corresponding self-interference/isolation report, respectively. For a given subcarrier spacing (SCS) (indicated by a value of p 1050), a value of $Z_4$ and $Z_4'$ for self-interference/isolation estimation are expected to larger than the values are $Z_3$ and $Z_3'$ for DL L1-RSRP reporting, respectively. Additionally, for a given SCS (indicated by a value of p), the value of $Z_4$ is expected to be larger than a minimum required processing time between a last symbol of a PDCCH carrying a triggering DCI and a first symbol of an SRS triggered for other purposes, such as UL and/or DL CSI acquisition. The variables $Z_1$, $Z_1'$, $Z_2$, and $Z_2'$ are minimum required delays for different types of CSI measurement and are not related to this disclosure. The variables $X_0$-$X_3$ and $KB_1$ and $KB_2$, can be found in Section 5.4 of 3GPP Technical Specification 38.214 (version g20).

While the set of candidate beams are described above as being based on measurement at the UE for CSI-RS received on a plurality of beams from the UE, in some embodiments, the set of candidate beams are based on measurement at the UE of positioning reference signals (PRS) received on a plurality of beams at the UE or tracking reference signals (TRS) received on a plurality of beams at the UE. While the set of candidate beams are described above as being based on measurement at the base station of SRS transmitted on a plurality of beams from the UE, in some embodiments, the set of candidate beams are based on measurement at the base station of PUCCH transmitted on a plurality of beams from the UE or random access channel (RACH) transmitted on a plurality of beams from the UE.

By the base station providing a candidate beam set to the UE, it is considered that beams that are not suitable for communicating with the BS will be precluded, thereby avoiding additional latency and resource consumption that may occur from exhaustive beam pair searching by the UE itself.

In some embodiments, by allowing the UE to select and report one or more possible UE transmit and UE receive beam pairs for FD transmission and corresponding self-interference/isolation levels, it is possible that the UE transmit and UE receive beam pairs at the UE that are not suitable for FD transmission will be deprioritized. Furthermore, the UE transmit and UE receive beam pairs that provide less self-interference, or better self-isolation, may be prioritized and tested within a first few measurement opportunities. In some embodiments, this may lead to a further reduction in latency and improved resource utilization.

Several methods of enabling cross-UE interference measurement between UEs to facilitate multi-UE transmission pairing for a group of UEs or for a group of at least one UE and at least one non-FD capable UEs will now be discussed.

In the context of multi-UE FD transmission, if the UE is given the opportunity to select and report the transmit and receive beam pair based on the SRS transmission for self-interference/isolation estimation and report to the base station at some later time, the measurement of cross-UE interference may become uncertain. This is because the base station cannot effectively coordinate beam selection at multiple UEs and the UEs are also unaware of beamforming behavior at neighbor UEs. As disclosed below, several possible methods are provided for assisting UE beamforming for cross-UE interference measurement by introducing information sharing among neighbor UEs via one or more of sidelink, dedicated UE reporting to the base station, or additional UE reporting to the base station.

In one embodiment, a method of enabling cross-UE interference measurement involves, for each SRS being transmitted for self-interference/isolation estimation, the UE shares by sidelink transmission the selected base station transmit beam. In some embodiments, selection of the base station transmit beam implies an associated receive beam of the UE sharing the information with the other UE for receiving the SRS. Detailed configuration information of SRS transmission for self-interference/isolation estimation for the UE sending the information can either be shared with neighbor UEs directly, or alternatively be informed to neighbor UEs in the form of SRS for cross-UE interference measurement. From such SRS configuration information, neighbor UEs can measure cross-UE interference, with an receive beam that is determined based on information shared by the UE sending the information.

Two schemes are described below involving selecting the UE receive beam at neighbor UEs when receiving the SRS. The first possibility is to choose the one that is suitable for DL reception with a same base station transmit beam. This would enable the base station to perform multi-UE FD transmission with the same base station transmit beam towards the UEs. The second possibility is to select the UE receive beam that can be used to receive from a base station transmit beam that is spatially distant from the base station transmit beam whose identity was shared by the UE. This would enable the base station to use spatially distant transmit beams to perform multi-UE transmission towards those UEs, assuming multiple antenna panels are available at the base station. The selected base station transmit beam can be represented by an SSB index and CSI-RS index, assuming the same CSI-RS resources are configured for these UEs. For the UE to determine the spatial distance between the two base station beams, the corresponding Euclidean distance after the SSB or CSI-RS indices are transformed into 2-dimensional Euclidean coordinates (by e.g., mod by maximum number of beams at one dimension) can be considered. The choice of these two possible schemes can be configured by the base station, or can be determined by the UE and potentially reported by the UE to the base station or neighbor UEs or shared by the UE with neighbor UEs.

Figure 11:
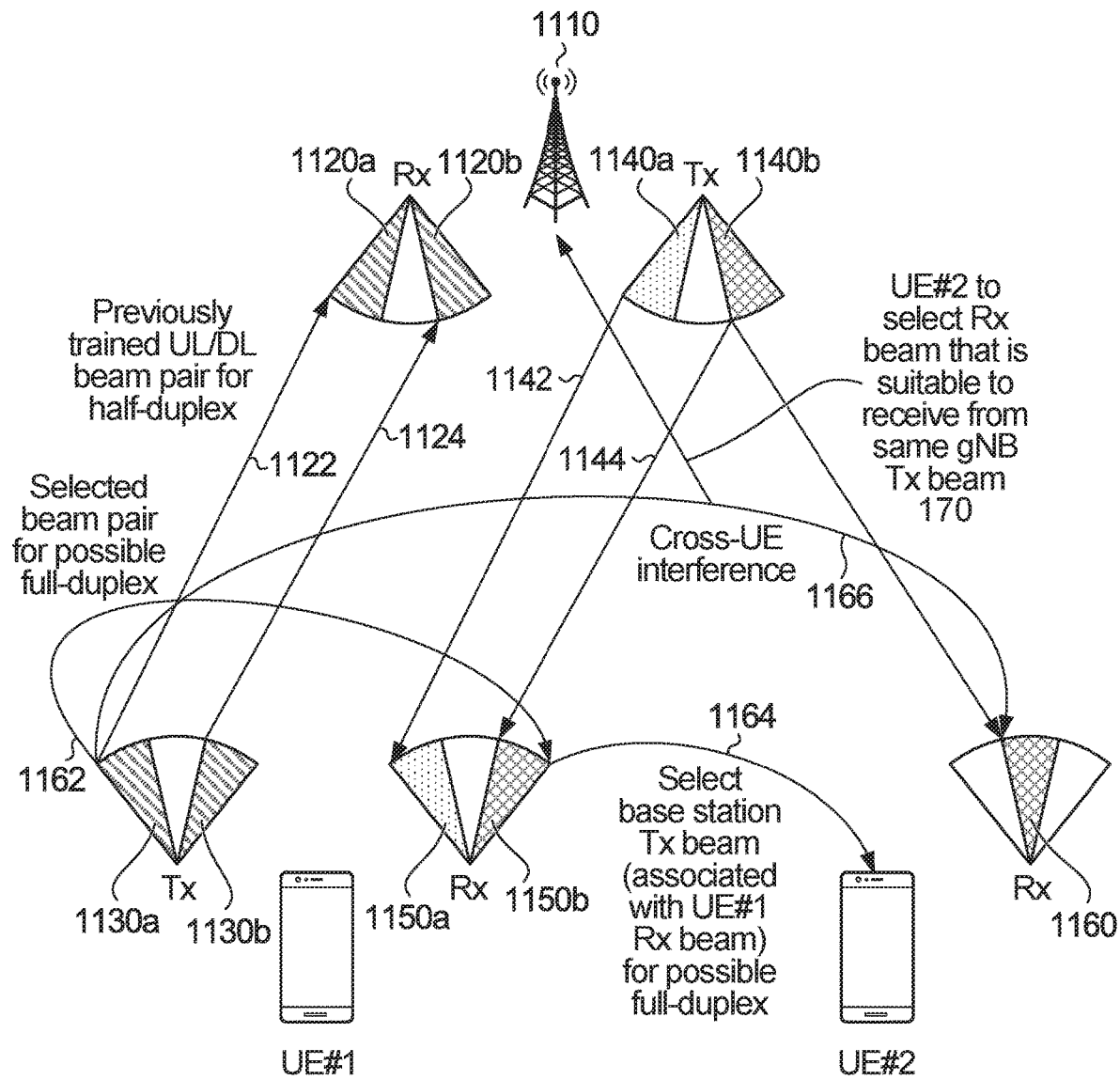
FIG. 11 is a schematic diagram of a multi-UE full duplex scheme configured to provide isolation between transmit and receive beams that is aided by side link communication between UEs according to an aspect of the application.

Referring to FIG. 11, an example of the method will now be described. The arrangement of FIG. 11 includes a base station 1110, a first UE, UE #1, illustrated to have at least two antenna panels that can transmit multiple beams and a second UE, UE #2 that has at least one antenna panel that is shown to be used for receiving on multiple beams. UL beam pair 1122 between UE #1 transmit beam 1130a and base station receive beam 1120a, UL beam pair 1124 between UE #1 transmit beam 1130b and base station receive beam 1120b, DL beam pair 1142 between base station transmit beam 1140a and UE #1 receive beam 1150a, and DL beam pair 1144 between base station transmit beam 1140b and UE #1 receive beam 1150b may have been determined during previous UL/DL beam pair training for half duplex transmissions. UE #1 determines 1162 a UE transmit and UE receive pair (1130a and 1150b) for FD with acceptable self-interference/self-isolation. This may be performed in the manner described above. UE #1 then shares 1164 the base station transmit beam 1140b for possible FD. When UE #1 transmits an SRS to determine whether there is acceptable self-interference/self-isolation between UE #1 transmit beam 1130a and UE #1 receive beam 1150b, UE #2 can determine 1166 a cross-interference estimation between UE #1 transmit beam 1130a and UE #2 receive beam 1160. When UE #2 selects a receive beam, UE #2 can report 1170 that selection to the base station 1110.

Another method of enabling cross-UE interference measurement in one embodiment involves, for each SRS being transmitted for self-interference/isolation estimation, the UE shares by sidelink transmission information on the selected UE transmit beam. Detailed configuration of SRS transmission for self-interference/isolation estimation for this UE can be either shared with neighbor UEs directly, or alternatively be informed to neighbor UEs in the form of SRS for cross-UE interference measurement. The UE transmit beam information can be based on previous beam training in sidelink transmissions between UEs. For example, if the UE has performed sidelink beam training by sending multiple SRS, the SRS index of the respective SRS can then be used to represent the UE transmit beam.

From SRS for self-interference/isolation estimation, or alternatively SRS for cross-UE interference measurement, neighbor UEs can measure cross-UE interference, with a receive beam that avoids strong interference between UEs, by exploiting channel knowledge obtained from previous sidelink beam training. Additionally, the receive beam selected by neighbor UEs may still need to be restricted to the candidate beam set configured by the base station, so to ensure proper DL reception from the base station. Using a restricted set of candidate beams is generally consistent with previously described embodiments in this disclosure.

Figure 12:
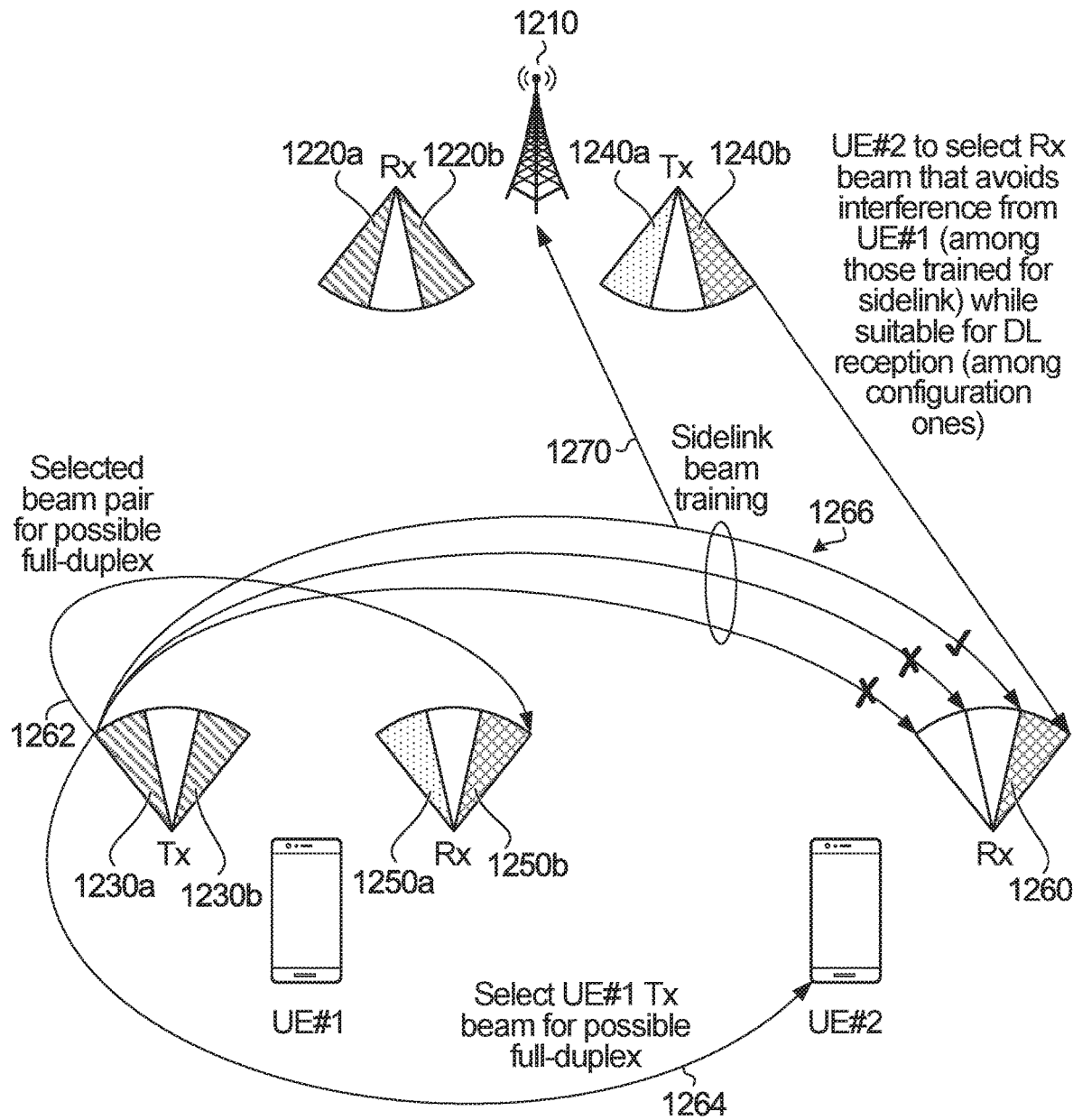
FIG. 12 is a schematic diagram of a multi-UE full duplex scheme configured to provide isolation between transmit and receive beams that is aided by side link communication between UEs according to another aspect of the application.

Referring to FIG. 12, an example of the method will now be described. The arrangement of FIG. 12 includes a base station 1210, a first UE, UE #1, illustrated to have at least two antenna panels that can transmit multiple beams and a second UE, UE #2 that has at least one antenna panel that is shown to be used for receiving on multiple beams. UL #1 has UE #1 transmit beam 1230a, UE #1 transmit beam 1230b, UE #1 receive beam 1250a and UE #1 receive beam 1250b. UL #2 has UE #2 receive beam 1260. Base station 1210 has base station transmit beam 1240a, base station transmit beam 1240*b*, base station receive beam 1220*a*, and base station receive beam 1220*b*.

UE #1 determines 1262 a transmit and receive pair (1230*a* and 1250*b*) for FD with acceptable self-interference/isolation. This may be performed in the manner described above. UE #1 then shares 1264 the base station transmit beam for possible FD. As part of sidelink beam training between UE #1 and UE #2, UE #1 transmits 1266 one or more SRS. UE #2 is then able to select a receive beam that avoids interference from UE #1 from among the SRS used for sidelink training while suitable for DL reception, i.e. selected from a set of candidate beams provided by the base station 1210. When UE #2 selects a receive beam, UE #2 can report 1270 that selection to the base station 1210.

The cross-UE interference measured at neighbor UEs, and the corresponding receive beam information, are reported to the base station, so as to facilitate the base station to decide whether and how to pair multiple UEs for multi-UE FD transmission. For one UE, the UE will be configured with SRS for self-interference/isolation estimation and SRS for cross-UE interference measurement. The latter can also be SRS for self-interference/isolation estimation for other UEs. The association between SRS for self-interference/isolation estimation and SRS for cross-UE interference measurement can be pre-defined, configured by the base station, or selected and reported by the UE.

In a scenario in which the association between the SRS for self-interference/isolation estimation and SRS for cross-UE interference measurement is pre-defined or configured by the base station (e.g., a one-to-one mapping between a particular SRS #1, #2 or #3 for self-isolation and a particular SRS #A, #B and #0 for cross interference, respectively, as shown in FIG. 13A), in one report for SRS for self-interference/isolation estimation, a selected SRS, transmit and receive beam, and measured self-interference/isolation may be included. In some embodiments, the UE may be configured to additionally report measured cross-UE interference that is measured from the associated SRS for cross-UE interference measurement, assuming that the UE receive beam selected and reported for the SRS for self-interference/isolation estimation is also used for receiving associated the SRS for cross-UE interference measurement.

When the association between the SRS for self-interference/isolation estimation and the SRS for cross-UE interference measurement are not configured, in one report for the SRS for self-interference/isolation estimation, the selected SRS, transmit and receive beam, and measured self-interference/isolation may be included. The base station may additionally configure the UE to report selected SRS for cross-UE interference measurement (as shown in FIG. 13B), possibly based on the transmit beam information for SRS for cross-UE interference measurement shared from neighbor UEs. For example, exploiting previous sidelink beam training results, the UE can select the SRS for cross-UE interference measurement, such that under the selected UE receive beam the resulting cross-UE interference from neighbor UE is relatively small.

In some embodiments, introducing information sharing via sidelink, i.e., sharing the selected base station transmit beam or UE transmit beam for each SRS for self-interference/isolation estimation, or both, the beam selection at multiple UEs can be better coordinated for the purpose of multi-UE FD transmission. This can potentially increase the success rate of multi-UE FD transmission and lower the latency.

In some embodiments, introducing pre-defined, configured or a reported association between the SRS for self-interference/isolation estimation and the SRS for cross-UE interference measurement, it is possible to improve the interference measurement assumption including UE receive beamforming between the base station and the UEs being served by the base station, which may lead to an improved efficiency for multi-user FD transmissions.

FIGS. 14 to 17 will now be used to describe several examples of signal flow diagrams that enable selection of transmit and receive beams pairs for FD transmission schemes and multi-UE FD transmission schemes.

Figure 14:
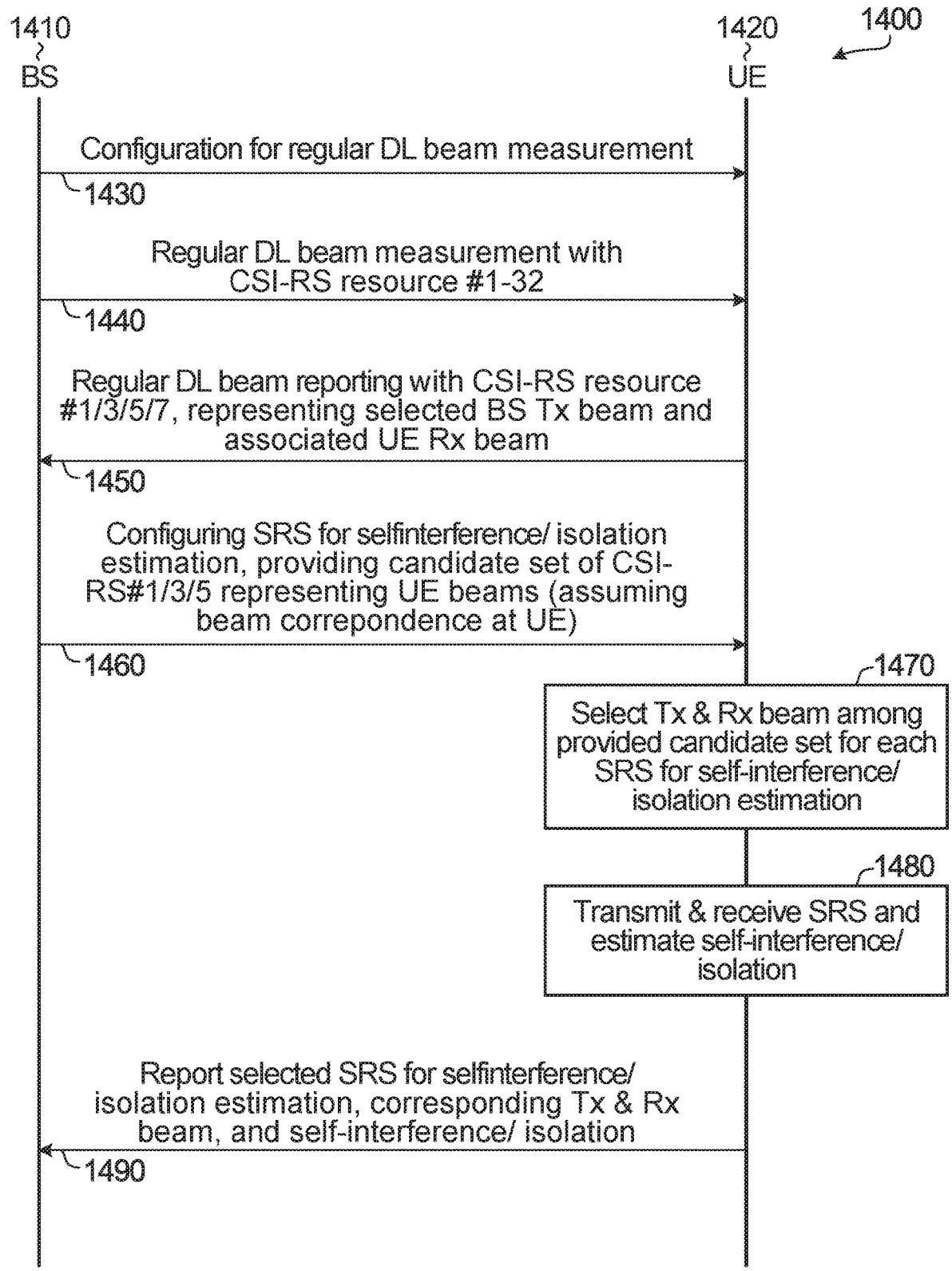
FIG. 14 is a signal flow diagram illustrating signaling between a base station and a UE for transmit and receive beam selection according to an aspect of the application.

FIG. 14 is an example signaling flow diagram 1400 to illustrate steps that may be involved in determining transmit and receive beam pairs for FD transmissions between a base station 1410 and a UE 1420 based on DL beam measurements. Step 1430 involves the base station 1410 transmitting configuration information to the UE 1420 to enable the UE 1420 to perform measurements on reference signals transmitted by the base station 1410. The configuration information includes information that notifies the UE 1420 about the reference signals, for example transmission resource information, reference signal index information, scrambling information for sequence generation, transmission timing and/or power, report content and/or format and/or timing, uplink resource for carrying report information. The reference signals may be channel state information reference signals (CSI-RS). Step 1440 involves the base station 1410 transmitting the reference signals to the UE 1420. Step 1450 involves the UE 1420 performing DL beam reporting with a particular set of CSI-RS resources (this may include a set of identifiers such as CSI-RS resources #1, #3, #5 and #7) representing selected base station transmit beam and associated UE receive beam. Step 1460 involves, based on the information reported to the base station 1410 in step 1450, the base station 1410 providing the UE 1420 configuration information about a reference signal the UE 1420 can use for self-interference/isolation estimation based on using a set of candidate beams. Referring to the set of CSI-RS resources indicated above, the set of candidate beams may include CSI-RS resources #1, #3, and #5 from that larger set. The reference signal may be a sounding reference signal (SRS). This may be based on beam correspondence at the UE 1420 with the base station 1410. Step 1470 involves the UE selecting UE transmit and UE receive beams from the candidate set in order to perform self-interference/isolation estimation. This may involve prioritizing the candidate sets to test in a particular order. Step 1480 involves the UE transmitting and receiving the reference signal in order to obtain the measurements for self-interference/isolation estimation. Step 1490 involves the UE reporting information about the reference signal that was used in performing the self-interference/isolation estimation, the selected UE transmit and UE receive beams and the measurement of the self-interference/isolation estimation.

Figure 15:
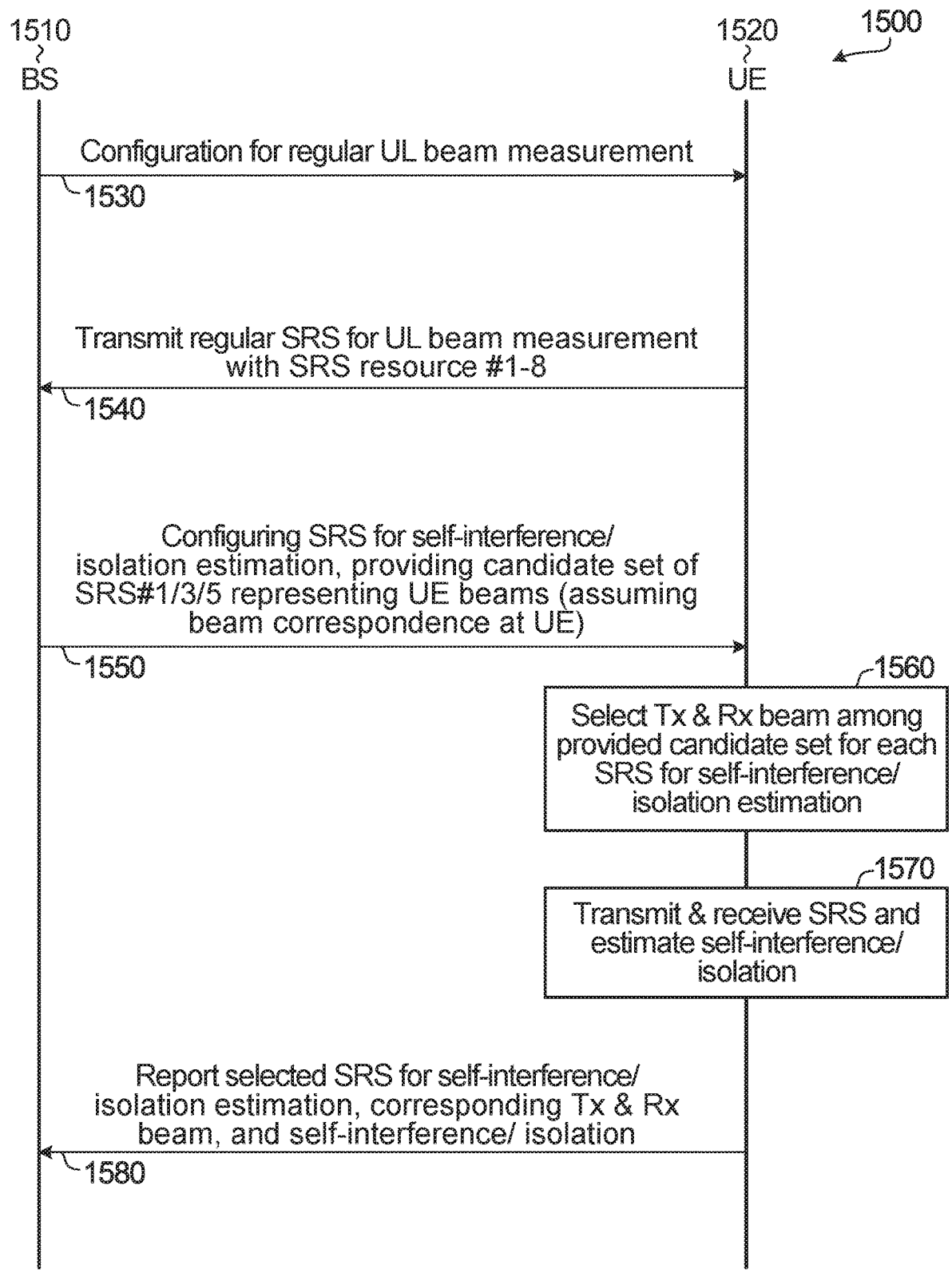
FIG. 15 is a signal flow diagram illustrating signaling between a base station and a UE for transmit and receive beam selection according to yet another aspect of the application.

FIG. 15 is an example signaling flow diagram 1500 to illustrate steps that may be involved in determining transmit and receive beam pairs for FD transmissions between a base station 1510 and a UE 1520 based on UL beam measurements. Step 1530 involves the base station 1510 transmitting configuration information to the UE 1520 to enable the UE 1520 to transmit reference signals to be measured by the base station 1510. The configuration information includes information that notifies the UE 1520 about the reference signals it is to use for example transmission resource information, reference signal index information, transmission timing, scrambling information for sequence generation. The reference signals may be SRS. Step 1540 involves the UE 1520 transmitting the reference signals, which may for example be SRS, to the base station 1510. In a particular example the reference signals may include SRS resources #1 to SRS #8. Step 1550 involves, based on the signal received by the base station 1510 in step 1540, the base station 1510 providing the UE 1520 configuration information about a reference signal the UE 1520 can use for self-interference/ isolation estimation based on using a set of candidate beams. Referring to the set of SRS resources indicated above, the set of candidate beams may include SRS resources #1, #3, and #5. This may be based on beam correspondence at the UE 1420 with the base station 1410. Step 1560 involves the UE selecting UE transmit and UE receive beams from the candidate set in order to perform self-interference/isolation estimation. This may involve prioritizing the candidate sets to test in a particular order. Step 1570 involves the UE transmitting and receiving the reference signal in order to obtain the measurements for self-interference/isolation estimation. Step 1580 involves the UE reporting information about the reference signal that was used in performing the self-interference/isolation estimation, the selected transmit and receive beams and the measurement of the self-interference/isolation estimation.

In some embodiments, the steps shown in both FIGS. 14 and 15 may be performed such that DL and UL beam measurement are both performed. The base station sends CSI-RS and the UE sends SRS, the base station determines two sets of candidate beams for the UE to choose from, one set of candidate DL receive beams based on DL beam measurements and one set of candidate UL transmit beams based on UL beam measurements, and then the UE performs self-interference/isolation estimation, selects one or more beam candidates, and then reports the beam selection back to the base station.

Figure 16:
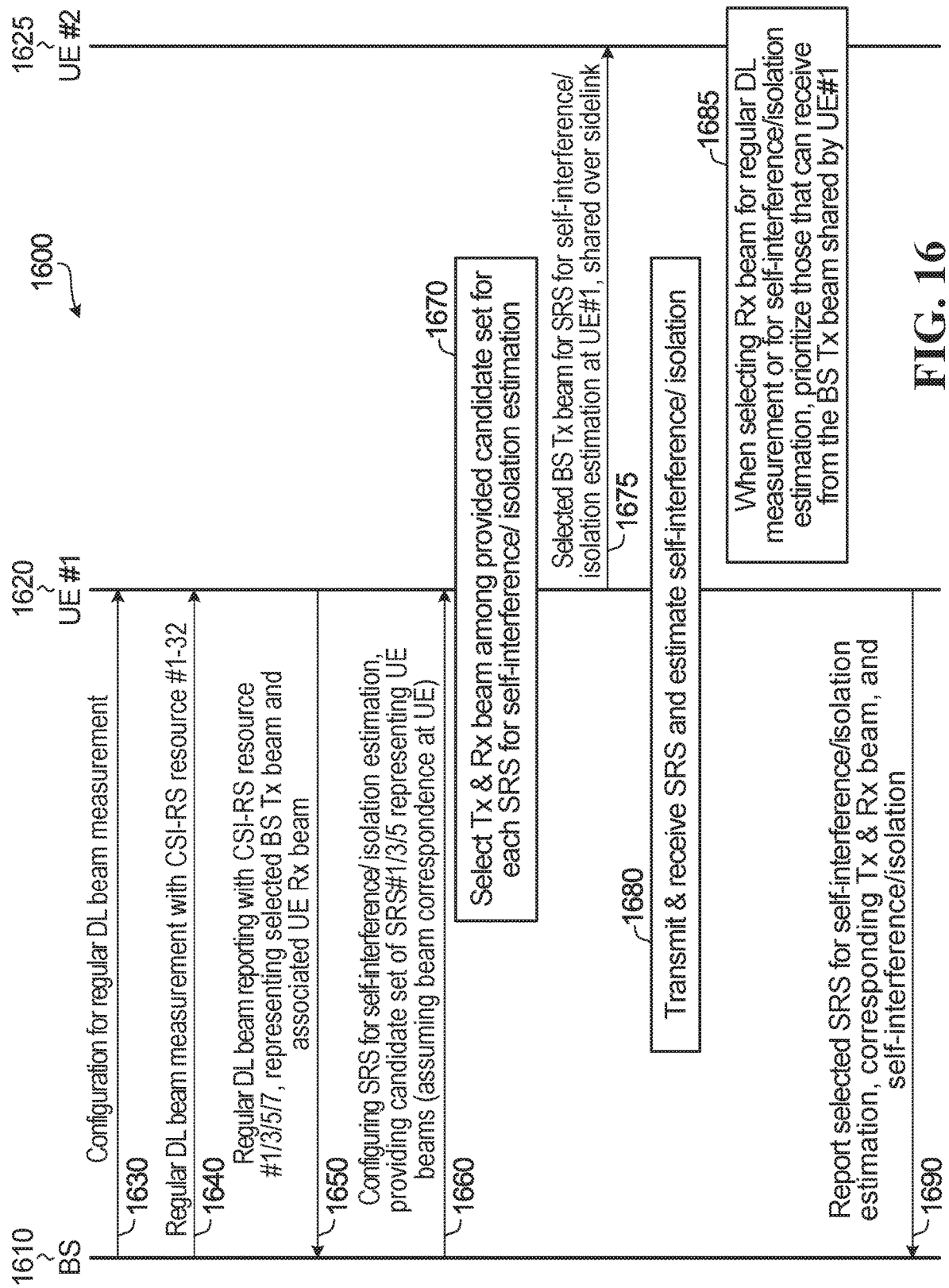
FIG. 16 is a signal flow diagram illustrating signaling between a base station and multiple UEs for transmit and receive beam selection according to an aspect of the application.

FIG. 16 is an example signaling flow diagram 1600 to illustrate steps that may be involved in determining transmit and receive beam pairs for FD transmissions between a base station 1610 and multiple UEs 1620,1625 based on DL beam measurements and using SL transmission between the UEs. Steps 1630 to 1670 are substantially the same as steps 1430 to 1470 of FIG. 14. Step 1675 involves the UE #1 1620 transmitting an indication of the base station transmit beam to UE #2 1625. Step 1680 involves the UE #1 1620 transmitting and receiving the reference signal in order to obtain the measurements for self-interference/isolation estimation. Step 1685 involves UE #2 1625, when selecting the UE #2 receive beam for DL measurement or for self-interference/isolation estimation, prioritizing beams of a candidate beam set that can received from the base station transmit beam that was shared by UE #1 1620. Step 1690 involves the UE #1 1620 reporting information about the reference signal that was used in performing the self-interference/isolation estimation, the selected transmit and receive beams and the measurement of the self-interference/ isolation estimation.

Figure 17:
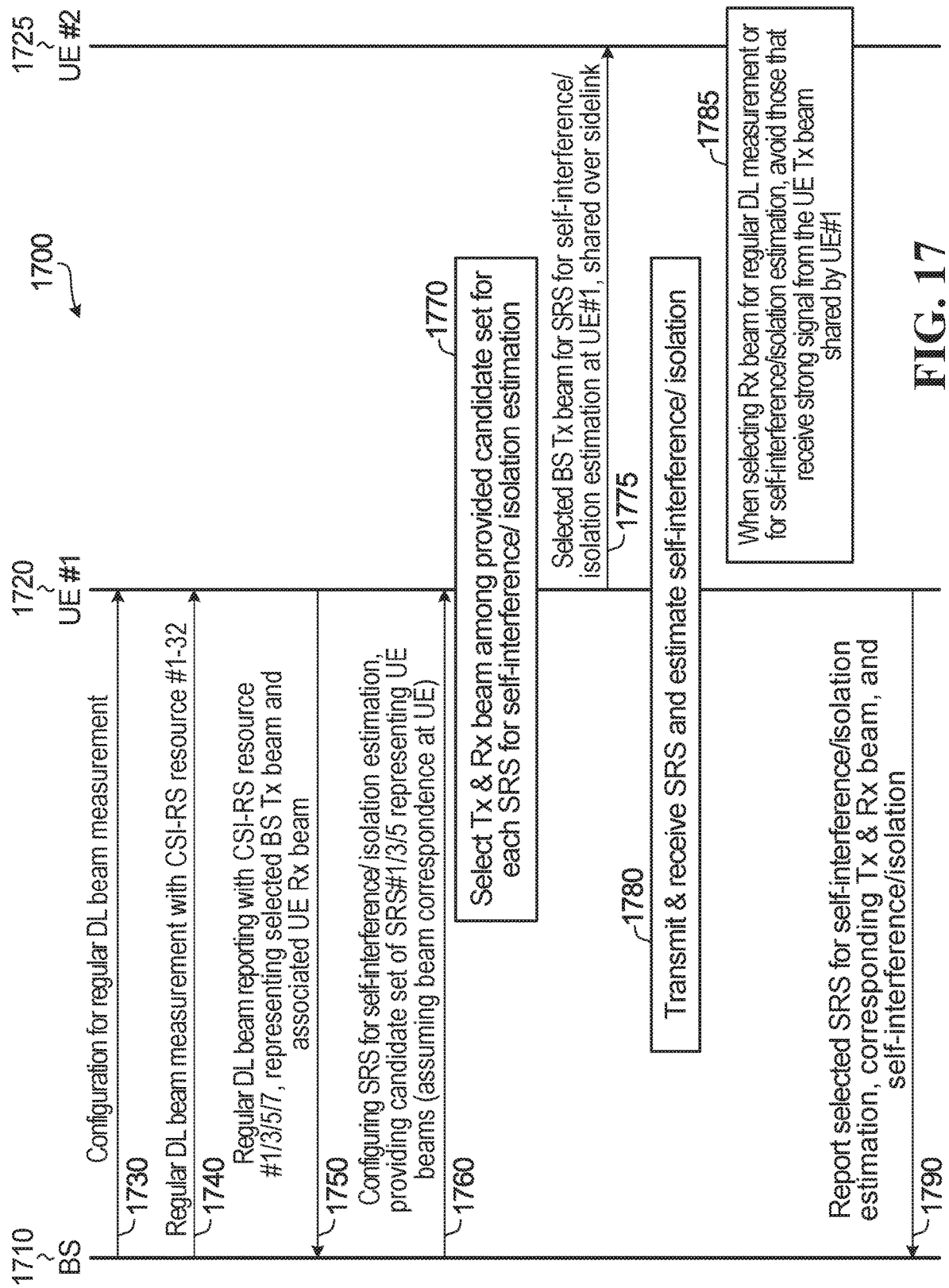
FIG. 17 is a signal flow diagram illustrating signaling between a base station and multiple UEs for transmit and receive beam selection according to yet another aspect of the application.

FIG. 17 is an example signaling flow diagram 1700 to illustrate steps that may be involved in determining transmit and receive beam pairs for FD transmissions between a base station 1710 and multiple UEs 1720,1725 based on DL beam measurements and using SL transmission between the UEs. Steps 1730 to 1770 are substantially the same as steps 1430 to 1470 of FIG. 14. Step 1775 involves the UE #1 1720 transmitting an indication of the UE #1 transmit beam to be used for self-interference/isolation at UE #1 1720 to UE #2 1725. Step 1780 involves the UE #1 1720 transmitting and receiving the reference signal in order to obtain the measurements for self-interference/isolation estimation. Step 1785 involves UE #2 1725, when selecting the UE #2 receive beam for DL measurement or for self-interference/ isolation estimation, avoiding candidate beams that receive a strong signal from the UE #1 transmit beam to be used for self-interference/isolation at UE #1 1720 shared by UE #1 1720. Step 1790 involves the UE #1 1720 reporting information about the reference signal that was used in performing the self-interference/isolation estimation, the selected transmit and receive beams and the measurement of the self-interference/isolation estimation.

In some embodiments, beam related information that is provided by a base station to a UE (e.g., the beam related information used to represent candidate beams at a UE for the UE select and pair for FD transmission) can be alternatively expressed in the form of angle(s) and/or range(s) of angle(s) that the UE can be beamforming to receive a signal from or transmit a signal towards. The beamforming may consist of switching among multiple UE panels or steering the beamforming on a given UE panel, or both. The angle(s) and/or range(s) of angle(s) can be expressed in global coordination systems (e.g., using the sun or the earth as reference) or in local coordination systems (e.g., using a facing direction of the UE as reference). The angle(s) and/or range(s) of angle(s) can also be expressed as a relative difference to a previous angle that the UE was beamforming towards at a previous time instance. The beam related information that is reported from a UE to a base station (e.g., one transmit beam and one receive beam at a UE that the UE has paired, measured, and observed with high self-isolation and/or low self-interference for FD transmission) and that can be shared by one UE with another (e.g., a BS transmit beam that is being used to communicate with the one UE) can be expressed in a similar manner. Instead of exact angles, the angular domains covered by a base station or a UE can alternatively be divided into several sectors (with potential overlapping), and the beam-related information mentioned above can alternatively be expressed in the form of sector numbers, representing an angular range that the UE can be beamforming to receive from or transmit towards. It is also possible the beam related information further contains desired beamforming gain(s) and/or emitted power(s) towards certain angle(s) and/or accumulated energy towards certain sector(s). As an alternative, the beam related information can be expressed in the form of angles and sectors that the UE should try to minimize energy emission during beamforming.

The base station mentioned in this invention, while generally described as being a terrestrial base station, can also be considered to be a satellite, or a vehicle, or a balloon or a high-altitude pseudo-satellite (HAPS) carrying a base station or a UE. The UE mentioned in this invention, while generally described as being a terrestrial UE, can also be considered to be a satellite, or a vehicle, or a balloon or a high-altitude pseudo-satellite (HAPS) carrying a base station or a UE.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/ modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    receiving, by an apparatus from a base station, configuration information comprising a set of candidate beams of the apparatus;
    selecting, by the apparatus, one or multiple apparatus transmit and apparatus receive beam pairs, wherein the apparatus transmit beam and apparatus receive beam of the one or multiple apparatus transmit and apparatus receive beam pairs belongs to the set of candidate beams;
    for each apparatus transmit and apparatus receive beam pair:
        transmitting, by the apparatus, a reference signal (RS) on the apparatus transmit beam;
        measuring, by the apparatus, interference signal strength of the RS on the apparatus receive beam;
        determining, by the apparatus, self-interference status for the apparatus transmit beam and the apparatus receive beam based on the measured interference signal strength;
    selecting, an apparatus transmit and apparatus receive beam pair based on the determined self-interference status, wherein the selected apparatus transmit and apparatus receive beam pair belongs to the one or multiple apparatus transmit and apparatus receive beam pairs; and
    transmitting, by the apparatus to the base station, an identification of an apparatus transmit beam and an apparatus receive beam of the selected apparatus transmit and apparatus receive beam pair.

2. The method of claim 1, wherein the self-interference status is self-interference or self-isolation, and wherein the selecting the apparatus transmit and apparatus receive beam pair comprises selecting at least one of:
    the apparatus transmit and apparatus receive beam pair with a highest self-isolation;
    the apparatus transmit and apparatus receive beam pair with a lowest self-interference;
    the apparatus transmit and apparatus receive beam pair with a self-isolation no less than a threshold value; or
    the apparatus transmit and apparatus receive beam pair with a self-interference no more than a threshold value.

3. The method of claim 1 further comprising transmitting, by the apparatus to the base station, an identification of at least one of:
    a self-interference or self-isolation value between the apparatus transmit beam and the apparatus receive beam of the selected apparatus transmit and apparatus receive beam pair; or
    an occasion or index of the reference signal transmitted by the apparatus.

4. The method of claim 1, wherein the identification of the apparatus transmit beam and apparatus receive beam comprises relative index among the candidate beams.

5. The method of claim 1 further comprising:
    after selecting the apparatus transmit and apparatus receive beam pair, transmitting, by the apparatus to a user equipment (UE), identification of a base station transmit beam being used between the apparatus and the base station.

6. The method of claim 1 further comprising:
    receiving, by the apparatus from a neighbor user equipment (UE), identification of a base station transmit beam being used between the neighbor UE and the base station; and
    wherein selecting the apparatus transmit and apparatus receive beam pair further comprises considering the identification of the base station transmit beam being used between the neighbor UE and the base station as part of the selecting.

7. The method of claim 6 further comprising:
    receiving, by the apparatus from the neighbor UE, a reference signal (RS) on an apparatus receive beam,
    measuring, by the apparatus, interference signal strength of the RS on the apparatus receive beam; and
    determining, by the apparatus, cross interference for the apparatus receive beam based on the measured interference signal strength.

8. An apparatus comprising:
    a processor; and
    a computer-readable medium, having stored thereon computer executable instructions, that when executed cause the apparatus to:
        receive, from a base station, configuration information comprising a set of candidate beams of the apparatus;
        selecting, by the apparatus, one or multiple apparatus transmit and apparatus receive beam pairs, wherein the apparatus transmit beam and apparatus receive beam of the one or multiple apparatus transmit and apparatus receive beam pairs belongs to the set of candidate beams;
        for each apparatus transmit and apparatus receive beam pair:
            transmit a reference signal (RS) on the apparatus transmit beam;
            measure interference signal strength of the RS on the apparatus receive beam;
            determine self-interference status for the transmit beam and the receive beam based on the measured interference signal strength;
        select an apparatus transmit and apparatus receive beam pair based on the determined self-interference status, wherein the selected apparatus transmit and apparatus receive beam pair belongs to the one or multiple apparatus transmit and apparatus receive beam pairs; and transmit to the base station an identification of an apparatus transmit beam and an apparatus receive beam of the selected apparatus transmit and apparatus receive beam pair.

9. The apparatus of claim 8, wherein the self-interference status is self-interference or self-isolation, and wherein the selecting the apparatus transmit and apparatus receive beam pair comprises selecting at least one of:
the apparatus transmit and apparatus receive beam pair with a highest self-isolation;
the apparatus transmit and apparatus receive beam pair with a lowest self-interference;
the apparatus transmit and apparatus receive beam pair with a self-isolation no lower than a threshold value; or
the apparatus transmit and apparatus receive beam pair with a self-interference no more than a threshold value.

10. The apparatus of claim 8, wherein the computer executable instructions, that when executed, further cause the apparatus to transmit to the base station an identification of at least one of:
a self-interference or self-isolation value between the apparatus transmit beam and the apparatus receive beam of the selected apparatus transmit and apparatus receive beam pair; or
an occasion or index of the reference signal transmitted by the apparatus.

11. The apparatus of claim 8, wherein the computer executable instructions, that when executed, further cause the apparatus to:
after selecting the apparatus transmit and apparatus receive beam pair, transmit to a user equipment (UE), identification of a base station transmit beam being used between the apparatus and the base station.

12. The apparatus of claim 8, wherein the computer executable instructions, that when executed, further cause the apparatus to:
receive from a neighbor user equipment (UE), identification of a base station transmit beam being used between the neighbor UE and the base station; and
wherein selecting the apparatus transmit and apparatus receive beam pairs further comprises considering the identification of the base station transmit beam being used between the neighbor UE and the base station as part of the selecting.

13. The apparatus of claim 12, wherein the computer executable instructions, that when executed, further cause the apparatus to:
receive, from the neighbor UE, a reference signal (RS) on an apparatus receive beam;
measure interference signal strength of the RS on the apparatus receive beam; and
determine cross interference for the apparatus receive beam based on the measured interference signal strength.

14. A non-transitory computer-readable storage medium having stored thereon computer-executable instructions, that when executed by a processor, cause the processor to:
receive, from a base station, configuration information comprising a set of candidate beams of an apparatus;
selecting one or multiple apparatus transmit and apparatus receive beam pairs, wherein the apparatus transmit beam and apparatus receive beam of the one or multiple apparatus transmit and apparatus receive beam pairs belongs to the set of candidate beams;
for each apparatus transmit and apparatus receive beam pair:
transmit a reference signal (RS) on the apparatus transmit beam;
measure interference signal strength of the RS on the apparatus receive beam;
determine self-interference status for the apparatus transmit beam and the apparatus receive beam based on the measured interference signal strength;
select an apparatus transmit and apparatus receive beam pair based on the determined self-interference status, wherein the selected apparatus transmit and apparatus receive beam pair belongs to the one or multiple apparatus transmit and apparatus receive beam pairs; and
transmit to the base station, an identification of an apparatus transmit beam and an apparatus receive beam of the selected apparatus transmit and apparatus receive beam pair.

15. The non-transitory computer-readable storage medium of claim 14, wherein the self-interference status is self-interference or self-isolation, and wherein the selecting the apparatus transmit and apparatus receive beam pair comprises selecting at least one of:
the apparatus transmit and apparatus receive beam pair with a highest self-isolation;
the apparatus transmit and apparatus receive beam pair with a lowest self-interference;
the apparatus transmit and apparatus receive beam pair with a self-isolation no less than a threshold value; or
the apparatus transmit and apparatus receive beam pair with a self-interference no more than a threshold value.

16. The non-transitory computer-readable storage medium of claim 14 wherein the computer executable instructions, when executed, further cause the processor to transmit to the base station, an identification of at least one of:
a self-interference or self-isolation value between the apparatus transmit beam and the apparatus receive beam of the selected apparatus transmit and apparatus receive beam pair; or
an occasion or index of the reference signal transmitted by the apparatus.

17. The non-transitory computer-readable storage medium of claim 14, wherein the identification of the apparatus transmit beam and the apparatus receive beam comprises relative index among the candidate beams.

18. The non-transitory computer-readable storage medium of claim 14, wherein the computer executable instructions, when executed, further cause the processor to:
after selecting the apparatus transmit and apparatus receive beam pair, transmit identification of a base station transmit beam being used.

19. The non-transitory computer-readable storage medium of claim 14, wherein the computer executable instructions, when executed, further cause the processor to:
receive from a neighbor user equipment (UE), identification of a base station transmit beam being used between the neighbor UE and the base station; and
wherein selecting the apparatus transmit and apparatus receive beam pair further comprises considering the identification of the base station transmit beam being used between the neighbor UE and the base station as part of the selecting.

20. The non-transitory computer-readable storage medium of claim 19, wherein the computer executable instructions, when executed, further cause the processor to:
receive from the neighbor UE, a reference signal (RS) on a receive beam, measuring interference signal strength of the RS on the receive beam; and determine cross interference for the receive beam based on the measured interference signal strength.

* * * * *